United States Patent
Kim et al.

(10) Patent No.: US 9,800,379 B2
(45) Date of Patent: Oct. 24, 2017

(54) METHOD FOR TRANSCEIVING CHANNEL STATE INFORMATION IN WIRELESS ACCESS SYSTEM, AND APPARATUS FOR SUPPORTING SAME

(71) Applicant: LG ELECTRONICS INC., Seoul (KR)

(72) Inventors: Jinmin Kim, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 14/758,787

(22) PCT Filed: Dec. 31, 2013

(86) PCT No.: PCT/KR2013/012421
§ 371 (c)(1),
(2) Date: Jun. 30, 2015

(87) PCT Pub. No.: WO2014/107020
PCT Pub. Date: Jul. 10, 2014

(65) Prior Publication Data
US 2015/0341152 A1    Nov. 26, 2015

Related U.S. Application Data

(60) Provisional application No. 61/748,117, filed on Jan. 1, 2013.

(51) Int. Cl.
*H04L 5/00* (2006.01)
*H04W 24/10* (2009.01)
(Continued)

(52) U.S. Cl.
CPC ......... *H04L 5/0048* (2013.01); *H04B 7/0417* (2013.01); *H04L 5/00* (2013.01);
(Continued)

(58) Field of Classification Search
CPC ... H04L 5/0007; H04L 5/0053; H04L 5/0023; H04L 5/0048; H04L 5/0051; H04L 5/0057; H04L 1/0026; H04L 1/1607
See application file for complete search history.

(56) References Cited

U.S. PATENT DOCUMENTS 7,835,426 B2    11/2010  Park et al.
7,852,959 B2 *  12/2010  Kwak .................. H04L 1/1861
                                               370/319
(Continued)

FOREIGN PATENT DOCUMENTS

KR    10-2010-0106251 A    10/2010
KR    10-2010-0136418 A    12/2010
(Continued)

*Primary Examiner* — Sai Aung
(74) *Attorney, Agent, or Firm* — Birch, Stewart, Kolasch & Birch, LLP

(57) ABSTRACT

The present invention relates to a wireless access system that supports massive MIMO, and provides a method for transceiving channel state information (CSI) for operating the massive MIMO and an apparatus for supporting said method. The method for transmitting CSI by a terminal in a wireless access system that supports massive multi-input multi-output (MIMO), according to one embodiment of the present invention, may comprise the steps of: receiving a signal including report period information; receiving downlink data including a reference signal; measuring first CSI using the reference signal; acquiring second CSI using the first CSI; and reporting the first CSI or the second CSI to a base station based on the report period information. According to the present invention, the first CSI may be information on a first antenna set including antennas for transmitting the reference signal, and the second CSI may be information on a second antenna set including antennas not transmitting the reference signal.

14 Claims, 21 Drawing Sheets

(51) Int. Cl.
*H04W 72/04* (2009.01)
*H04W 24/00* (2009.01)
*H04B 7/0417* (2017.01)
*H04W 88/02* (2009.01)

(52) U.S. Cl.
CPC ........... *H04W 24/00* (2013.01); *H04W 24/10* (2013.01); *H04W 72/042* (2013.01); *H04W 88/02* (2013.01)

(56) References Cited

U.S. PATENT DOCUMENTS

| | | | |
|---|---|---|---|
| 2010/0046356 A1* | 2/2010 | Chun | H04L 5/0016 370/208 |
| 2011/0235743 A1* | 9/2011 | Lee | H04L 5/0048 375/295 |
| 2012/0014477 A1 | 1/2012 | Ko et al. | |
| 2012/0051257 A1 | 3/2012 | Kim et al. | |
| 2015/0282202 A1* | 10/2015 | Miao | H04L 1/00 370/329 |

FOREIGN PATENT DOCUMENTS

| | | |
|---|---|---|
| WO | WO 2011/100672 A1 | 8/2011 |
| WO | WO 2012/112281 A2 | 8/2012 |

* cited by examiner

FIG. 4
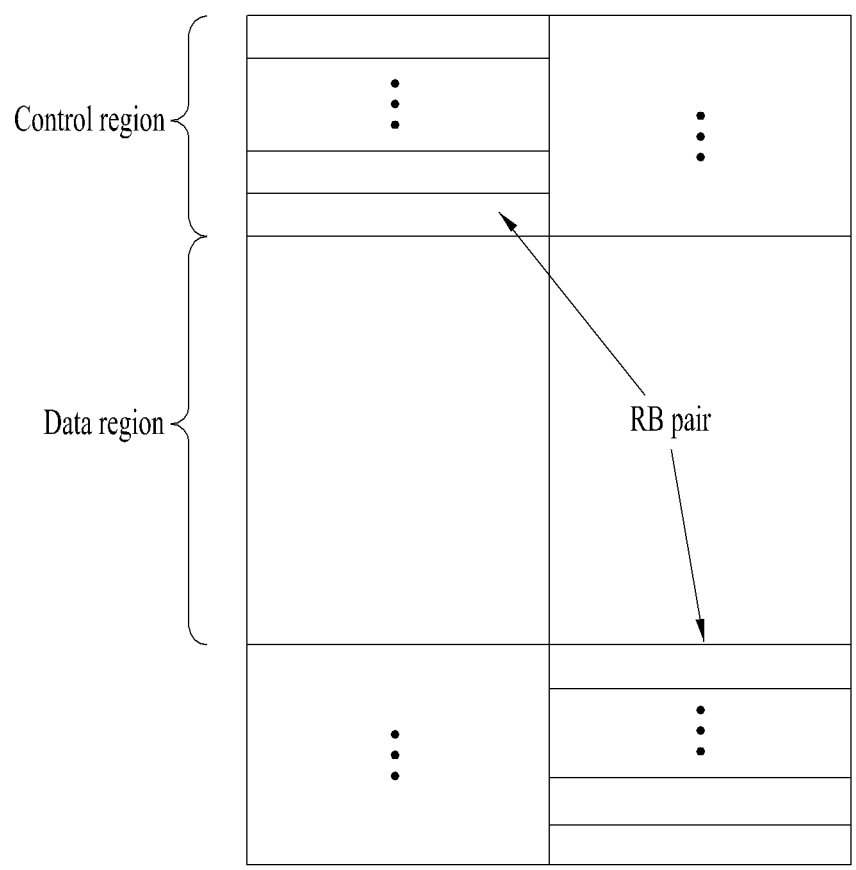
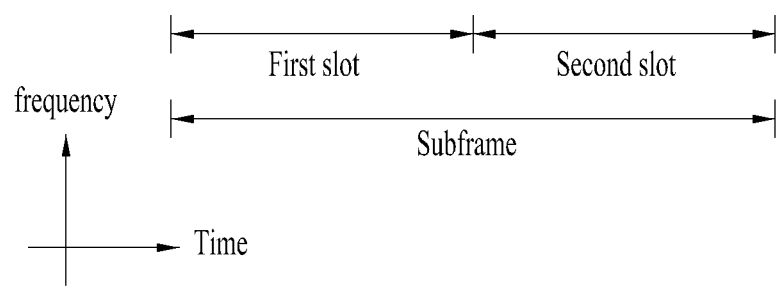

FIG. 11
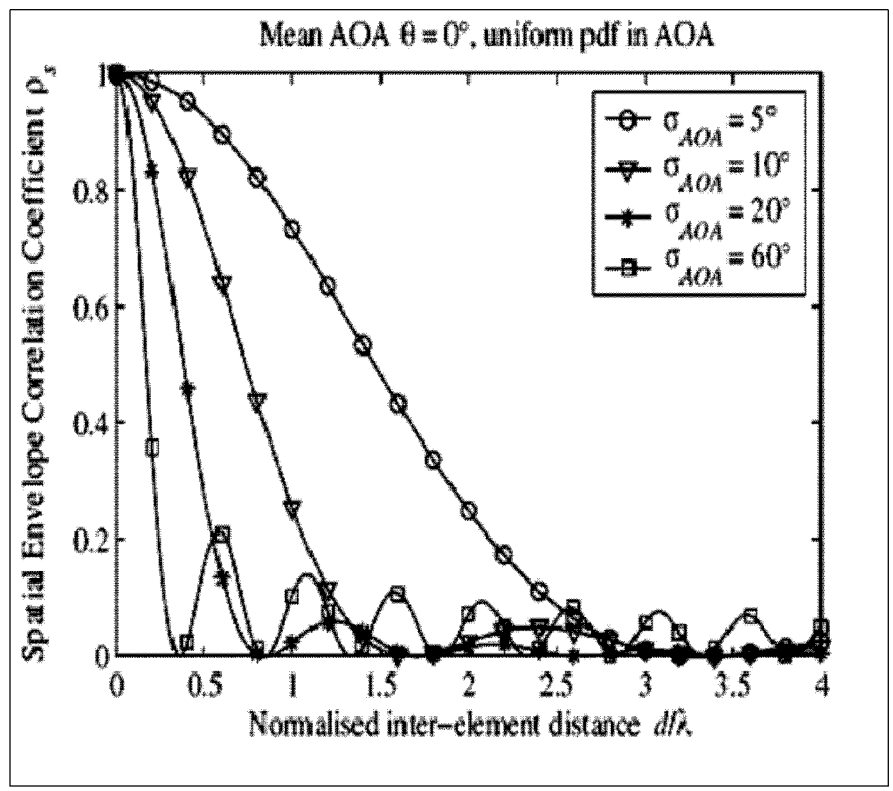
(a)
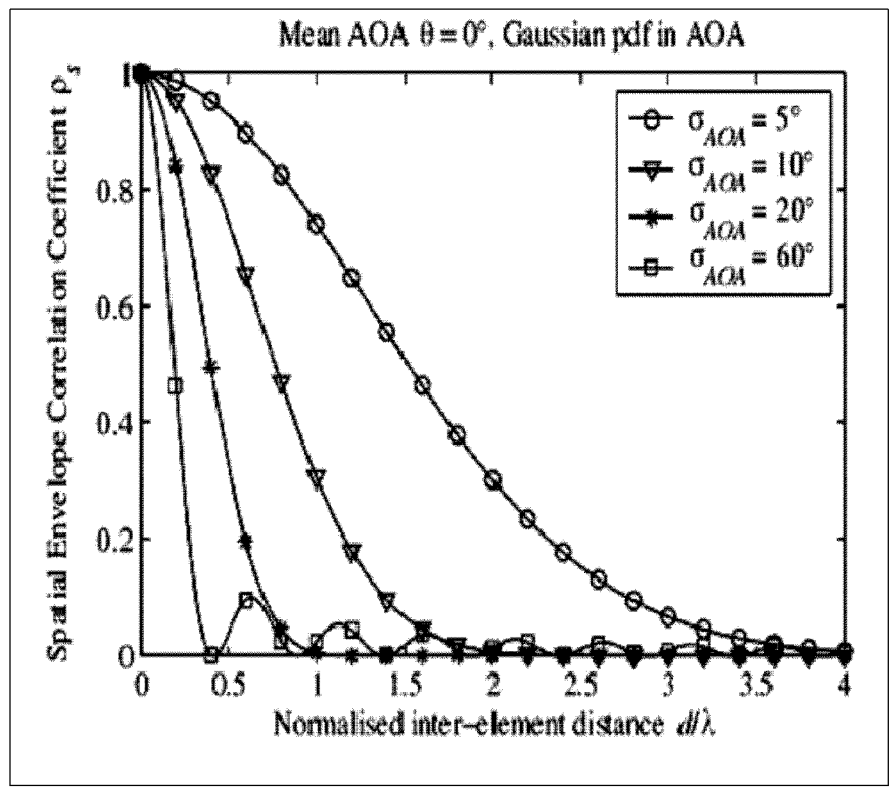
(b)

FIG. 12
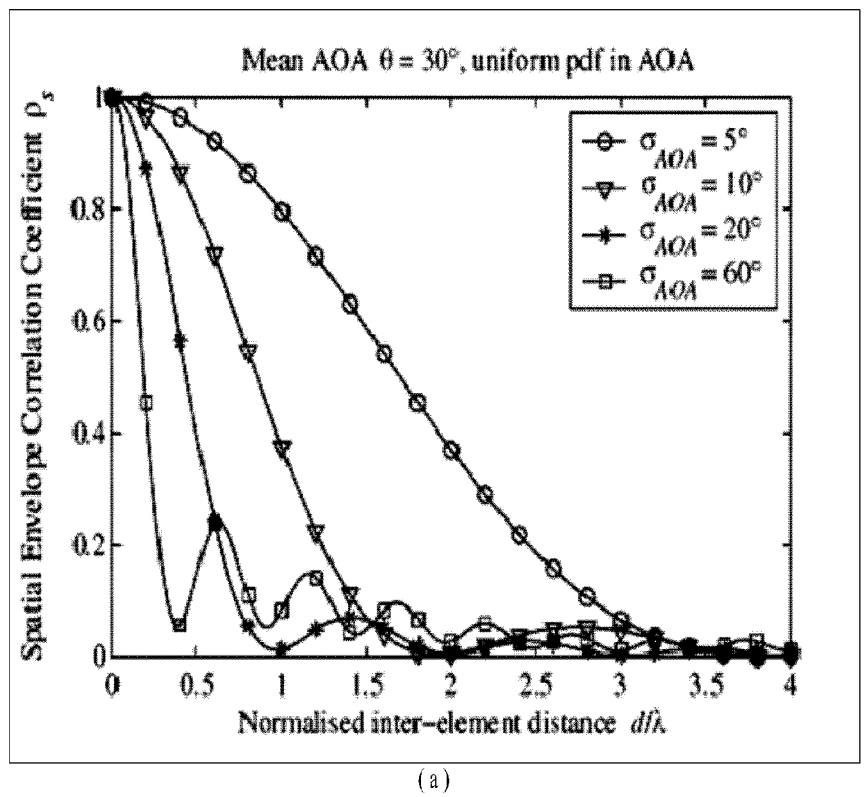
(a)
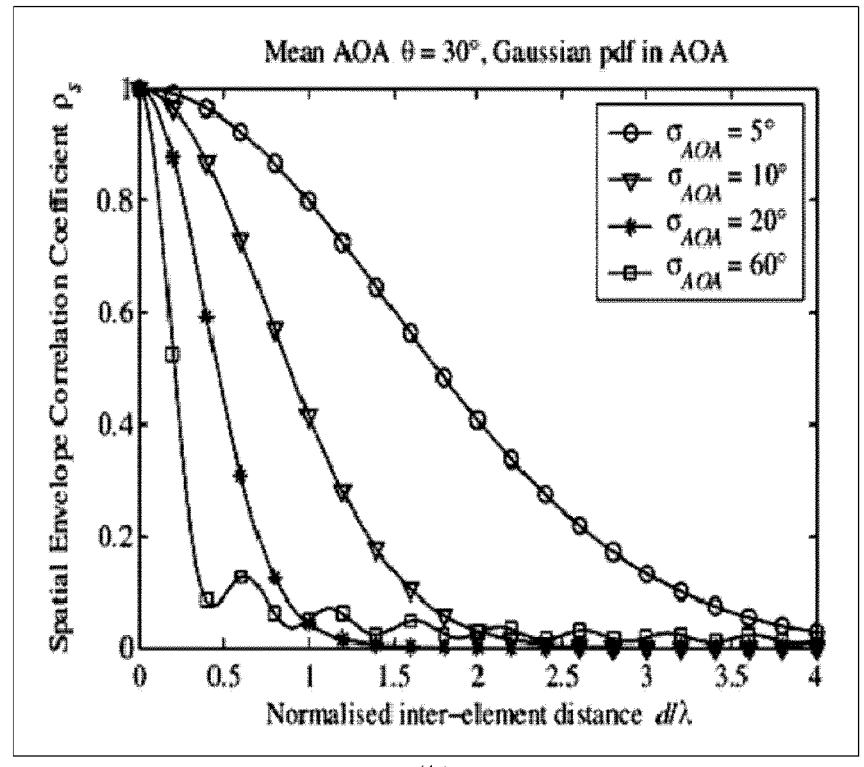
(b)

FIG. 13
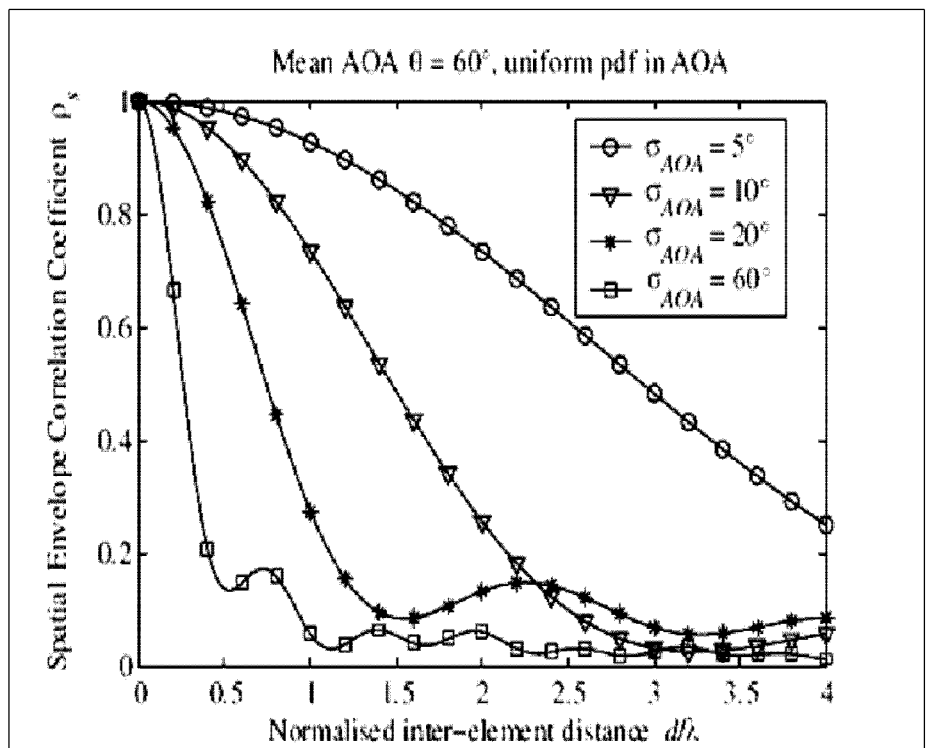
(a)
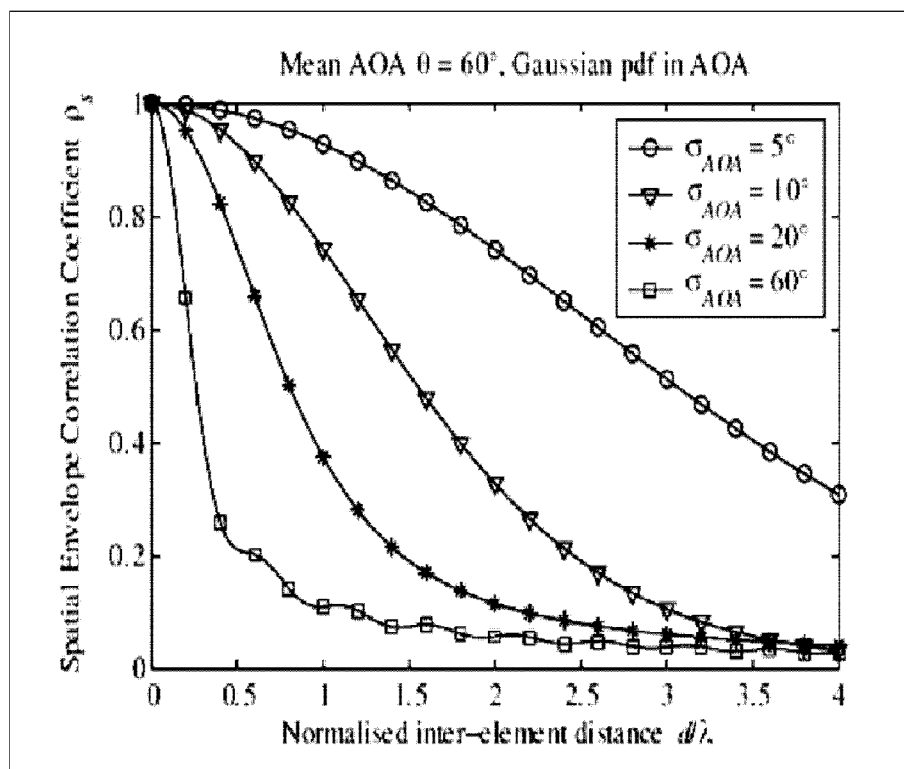
(b)

FIG. 14
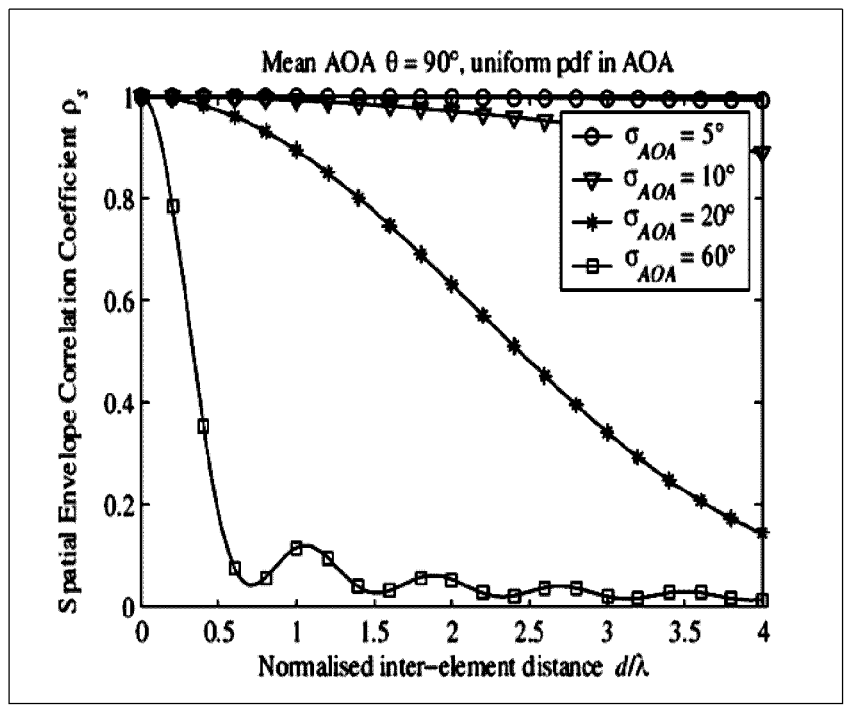
(a)
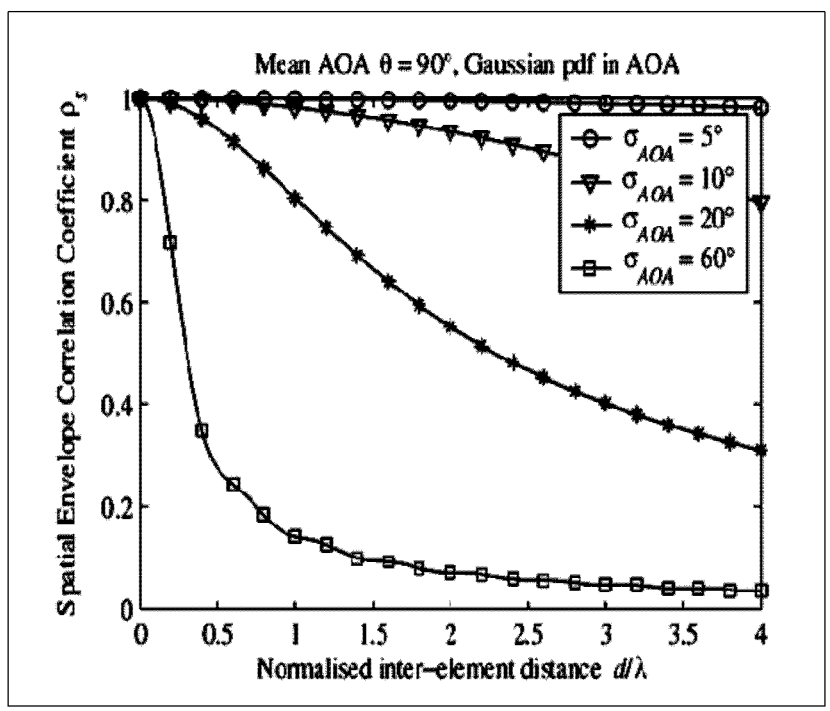
(b)

FIG. 15
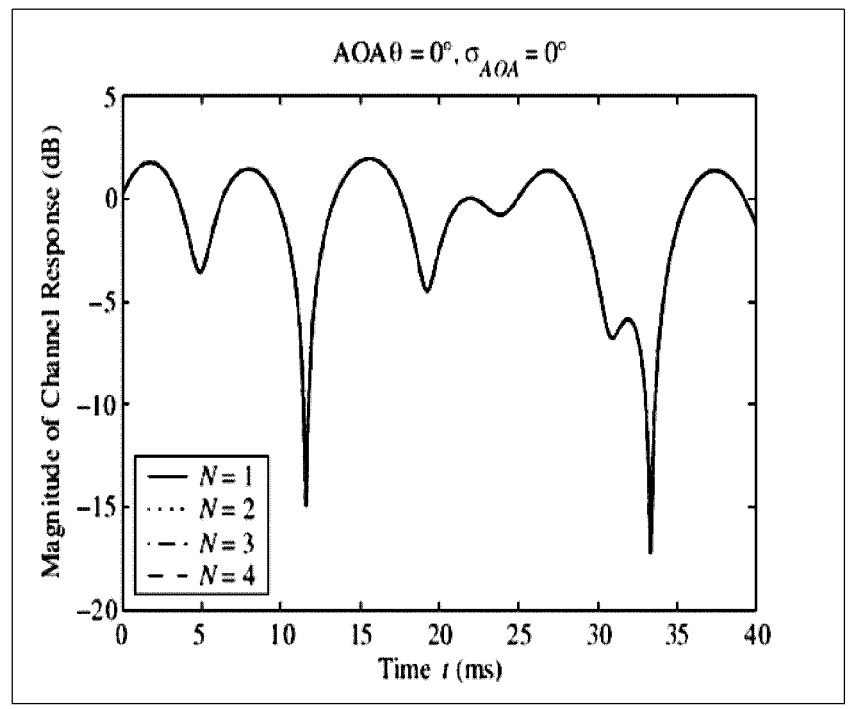
(a)
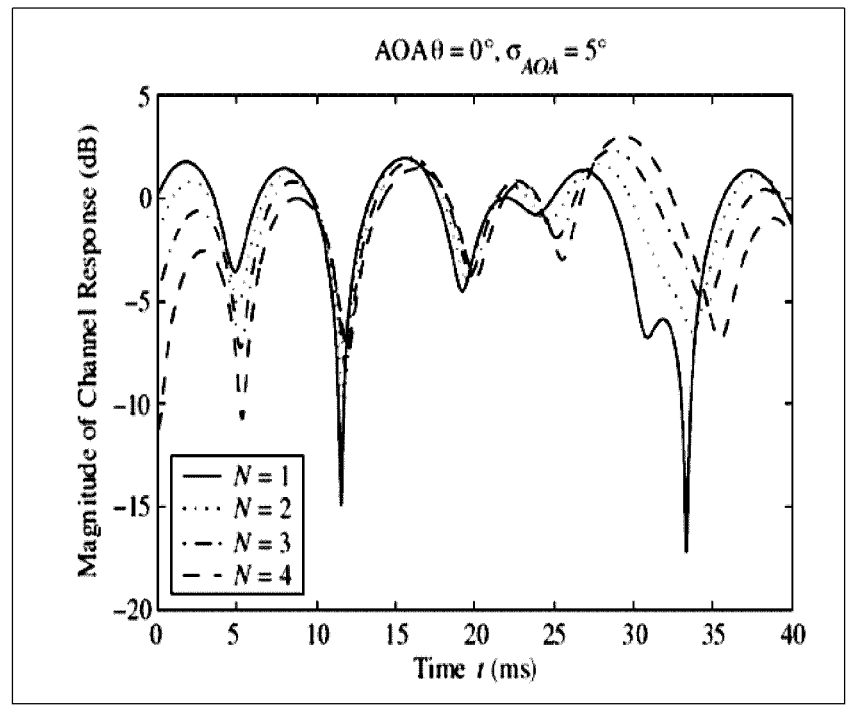
(b)

FIG. 16
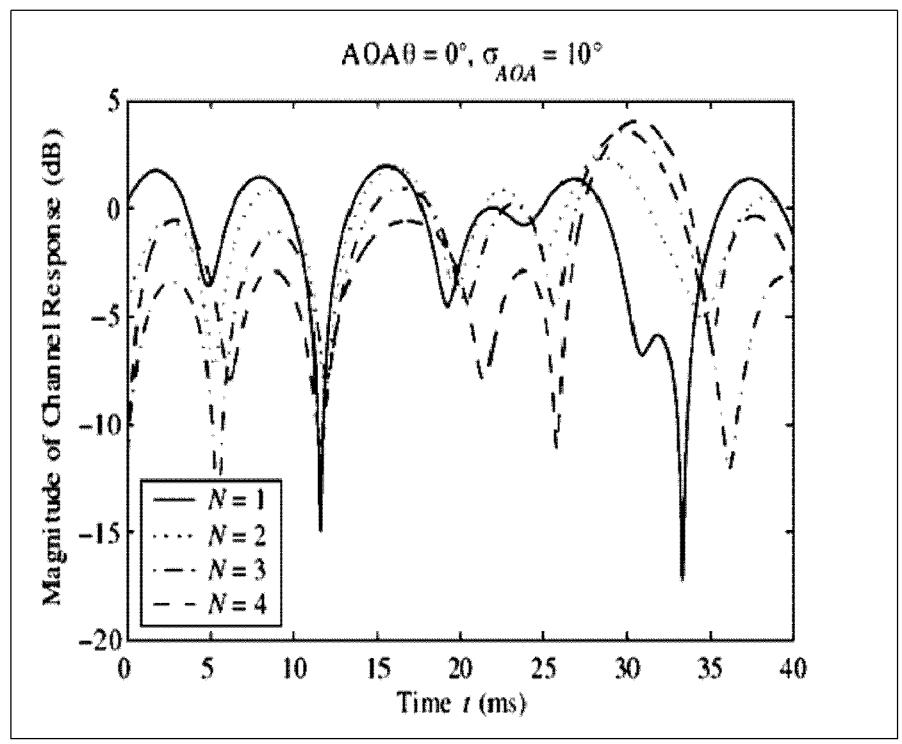
(a)
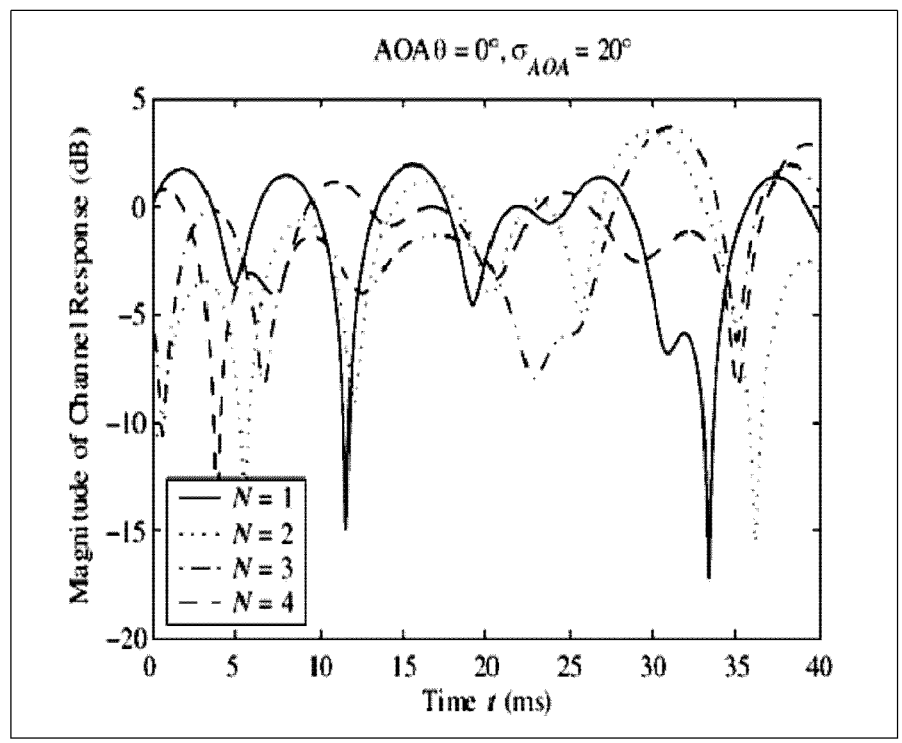
(b)

METHOD FOR TRANSCEIVING CHANNEL STATE INFORMATION IN WIRELESS ACCESS SYSTEM, AND APPARATUS FOR SUPPORTING SAME

CROSS REFERENCE TO RELATED APPLICATIONS

This application is the National Phase of PCT International Application No. PCT/KR2013/012421, filed on Dec. 31, 2013, which claims priority under 35 U.S.C. 119(e) to U.S. Provisional Application No. 61/748,117, filed on Jan. 1, 2013, all of which are hereby expressly incorporated by reference into the present application.

TECHNICAL FIELD

The present invention relates to a wireless access system supportive of massive MIMO (multi-input multi-output), and more particularly, to a method of transceiving channel state information (CSI) for operating the massive MIMO and apparatus for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE OF THE INVENTION

Technical Task

One technical task of the present invention is to provide a method of efficiently transceiving data in a massive MIMO environment.

Another technical task of the present invention is to provide a method of eliminating ICI (intra cell interference) and noise in a manner of maximizing a beam gain using a number of antennas in a massive MIMO environment.

Another technical task of the present invention is to provide methods of feeding back channel state information in a massive MIMO environment.

Further technical task of the present invention is to provide methods of performing beamforming based on a channel state information in a massive MIMO environment.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

The present invention relates to a wireless access system supportive of massive MIMO and provides a method of transceiving a channel state information (CSI) for operating the massive MIMO and apparatus for supporting the same.

In a $1^{st}$ technical aspect of the present invention, provided herein is a method of transmitting a channel state information (CSI) transmitted by a user equipment in a wireless access system supportive of massive MIMO (multi-input multi-output), including the steps of receiving a signal including a reporting period information, receiving downlink data including a reference signal, measuring a $1^{st}$ CSI using the reference signal, obtaining a $2^{nd}$ CSI using the $1^{st}$ CSI, and reporting the $1^{st}$ CSI and/or the $2^{nd}$ CSI to a base station based on the reporting period information. In this case, the $1^{st}$ CSI may include an information on a $1^{st}$ antenna set including antennas configured to transmit the reference signal and the $2^{nd}$ CSI may include an information on a $2^{nd}$ antenna set including antennas configured not to transmit the reference signal.

In a $2^{nd}$ technical aspect of the present invention, provided herein is a user equipment for transmitting a channel state information (CSI) in a wireless access system supportive of massive MIMO (multi-input multi-output), including a receiver, a transmitter and a processor configured to support the massive MIMO. In this case, the processor may control the receiver to receive a signal including a reporting period information and to receive downlink data including a reference signal. Moreover, the processor may measure a $1^{st}$ CSI using the reference signal and obtain a $2^{nd}$ CSI using the $1^{st}$ CSI. Furthermore, the processor may control the transmitter to report the $1^{st}$ CSI and/or the $2^{nd}$ CSI to a base station based on the reporting period information. In this case, the $1^{st}$ CSI may include an information on a $1^{st}$ antenna set including antennas configured to transmit the reference signal and the $2^{nd}$ CSI may include an information on a $2^{nd}$ antenna set including antennas configured not to transmit the reference signal.

Preferably, the reporting period information may include at least one of an information on a reporting period and a reporting time for the $1^{st}$ CSI and an information on a reporting period and a reporting time for the $2^{nd}$ CST.

More preferably, the reporting period and the reporting time for the $1^{st}$ CSI may be configured to be independent from the reporting period and the reporting time for the $2^{nd}$ CSI.

Preferably, the reporting period information may include an information on a reporting period and a reporting time for the $1^{st}$ CSI only and a reporting period and a reporting time for the $2^{nd}$ CSI may be dependently determined in accordance with the reporting period and the reporting time for the $1^{st}$ CSI The afore-described aspects of the present disclosure are merely a part of embodiments of the present disclosure. Those skilled in the art will derive and understand various embodiments reflecting the technical features of the present disclosure from the following detailed description of the present disclosure.

Advantageous Effects

According to the embodiments of the present disclosure, the following effects can be achieved.

First of all, data can be efficiently transceived in a massive MIMO environment.

Secondly, ICI (intra cell interference) and noise can be eliminated in a manner of maximizing a beam gain even if a number of antennas are used in a massive MIMO environment.

Thirdly, overhead on a massive antenna system can be reduced in a manner of efficiently feeding back a channel state information in a massive MIMO environment.

Fourthly, a data service optimized for a user can be provided in a manner of performing beamforming based on a channel state information in a massive MIMO environment.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 4 illustrates a structure of an UpLink (UL) subframe, which may be used in embodiments of the present disclosure;

FIGS. 11 to 14 are diagrams of spatial correlation values in case of both uniform distribution of AOA and Gaussian distribution of AOA;

FIGS. 15 to 19 are diagrams for magnitude values of channel responses for antennas in accordance with angle spread (AS) values;

BEST MODE FOR INVENTION

Figure 1:
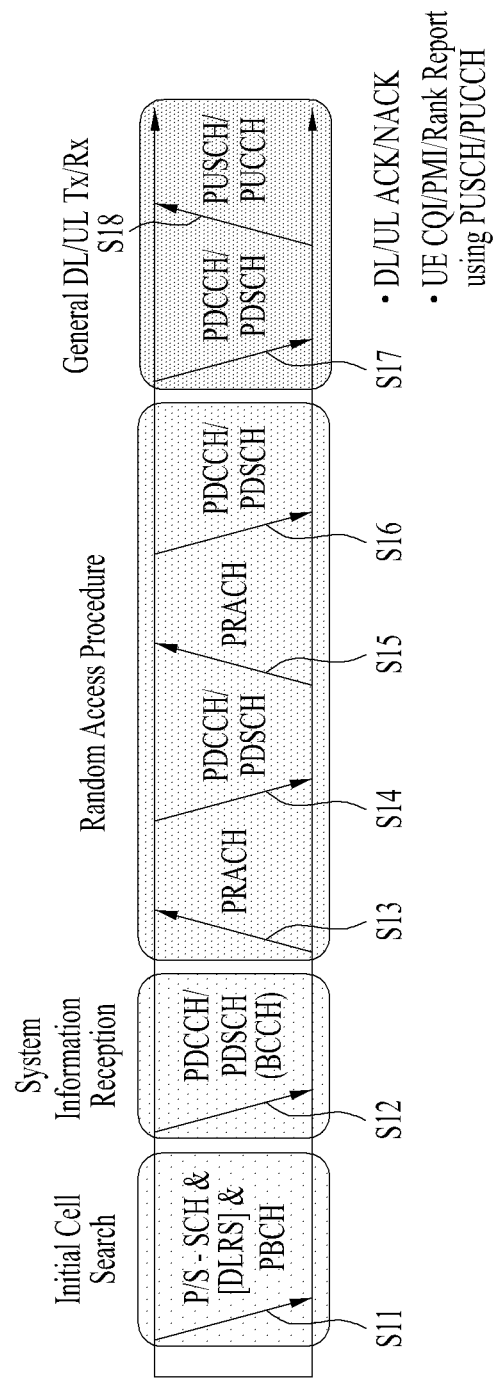
FIG. 1 illustrates physical channels and a general signal transmission method using the physical channels, which may be used in embodiments of the present disclosure.

The present invention relates to a wireless access system supportive of ultra-high frequency band and provides a method of transceiving a channel quality indication (CQI) information in consideration of a channel degradation effect in the ultra-high frequency band and apparatuses for supporting the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term used in embodiments of the present disclosure, TA is interchangeable with time advance, timing adjustment, or time adjustment in the same meaning.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
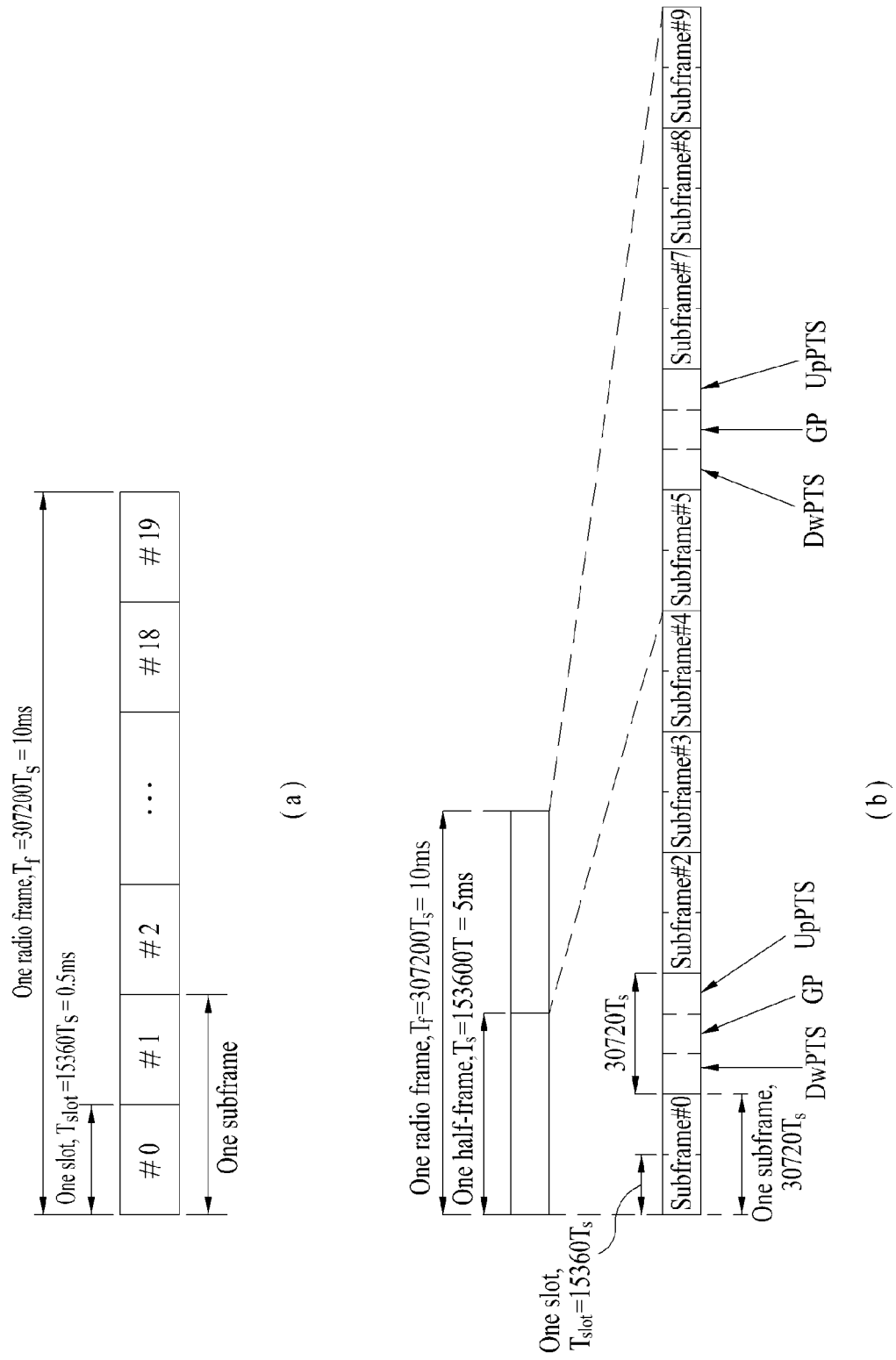
FIG. 2 illustrates radio frame structures used in embodiments of the present disclosure.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_S$ | $2192 \cdot T_S$ | $2560 \cdot T_S$ | $7680 \cdot T_S$ | $2192 \cdot T_S$ | $2560 \cdot T_S$ |
| 1 | $19760 \cdot T_S$ | | | $20480 \cdot T_S$ | | |
| 2 | $21952 \cdot T_S$ | | | $23040 \cdot T_S$ | | |
| 3 | $24144 \cdot T_S$ | | | $25600 \cdot T_S$ | | |
| 4 | $26336 \cdot T_S$ | | | $7680 \cdot T_S$ | $4384 \cdot T_S$ | $5120 \cdot T_S$ |
| 5 | $6592 \cdot T_S$ | $4384 \cdot T_S$ | $5120 \cdot T_S$ | $20480 \cdot T_S$ | | |
| 6 | $19760 \cdot T_S$ | | | $23040 \cdot T_S$ | | |
| 7 | $21952 \cdot T_S$ | | | — | — | — |
| 8 | $24144 \cdot T_S$ | | | — | — | — |

Figure 3:
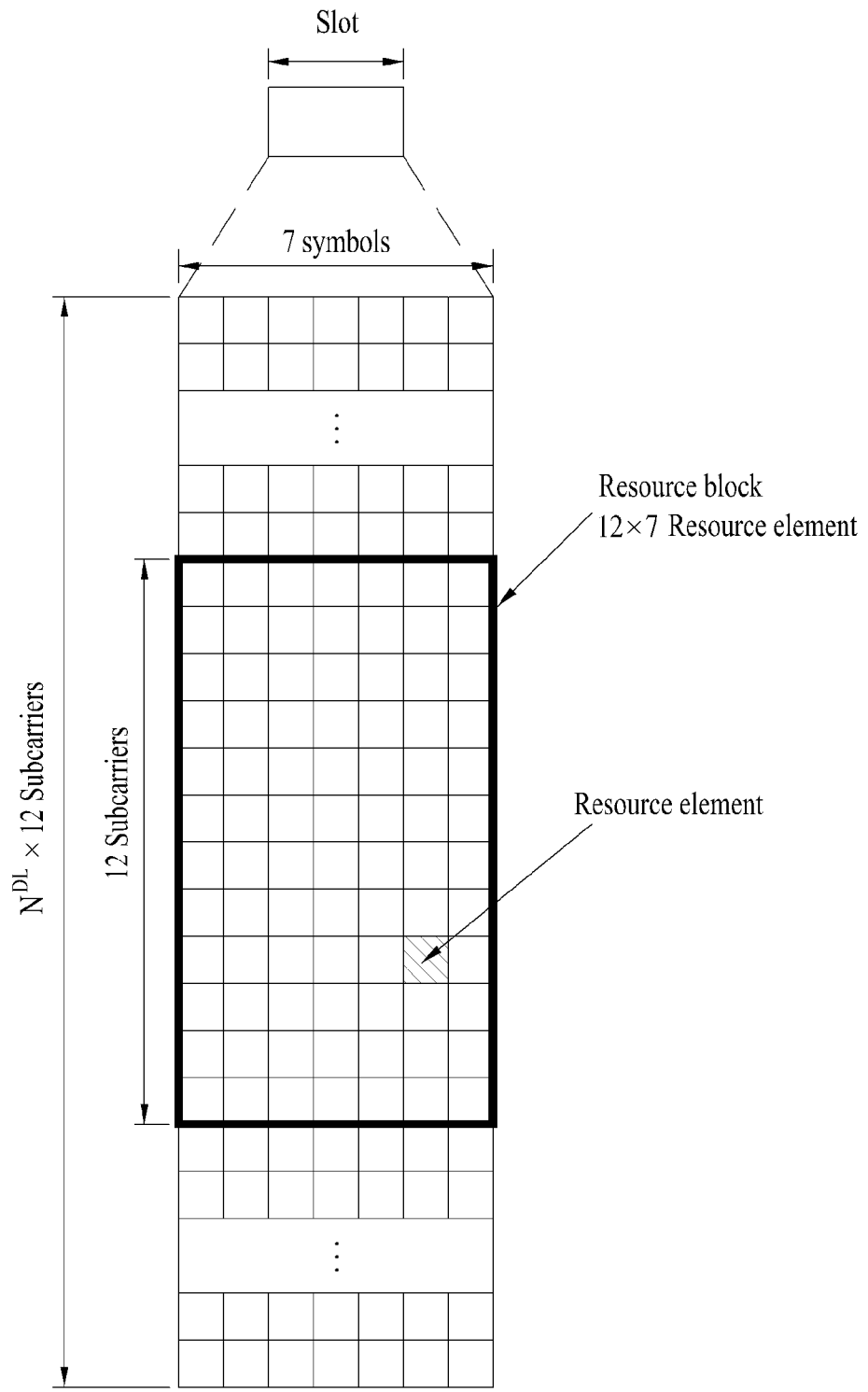
FIG. 3 illustrates a structure of a DownLink (DL) resource grid for the duration of one DL slot, which may be used in embodiments of the present disclosure.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
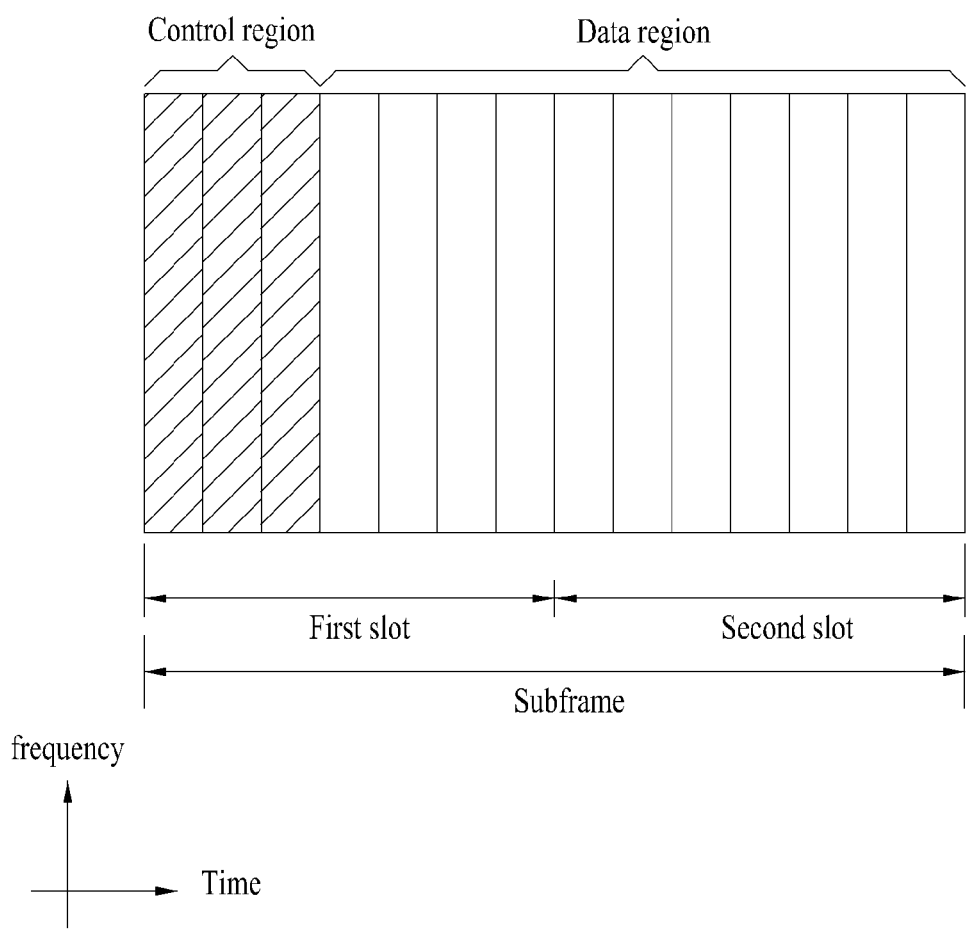
FIG. 5 illustrates a structure of a DL subframe, which may be used in embodiments of the present disclosure.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

Figure 6:
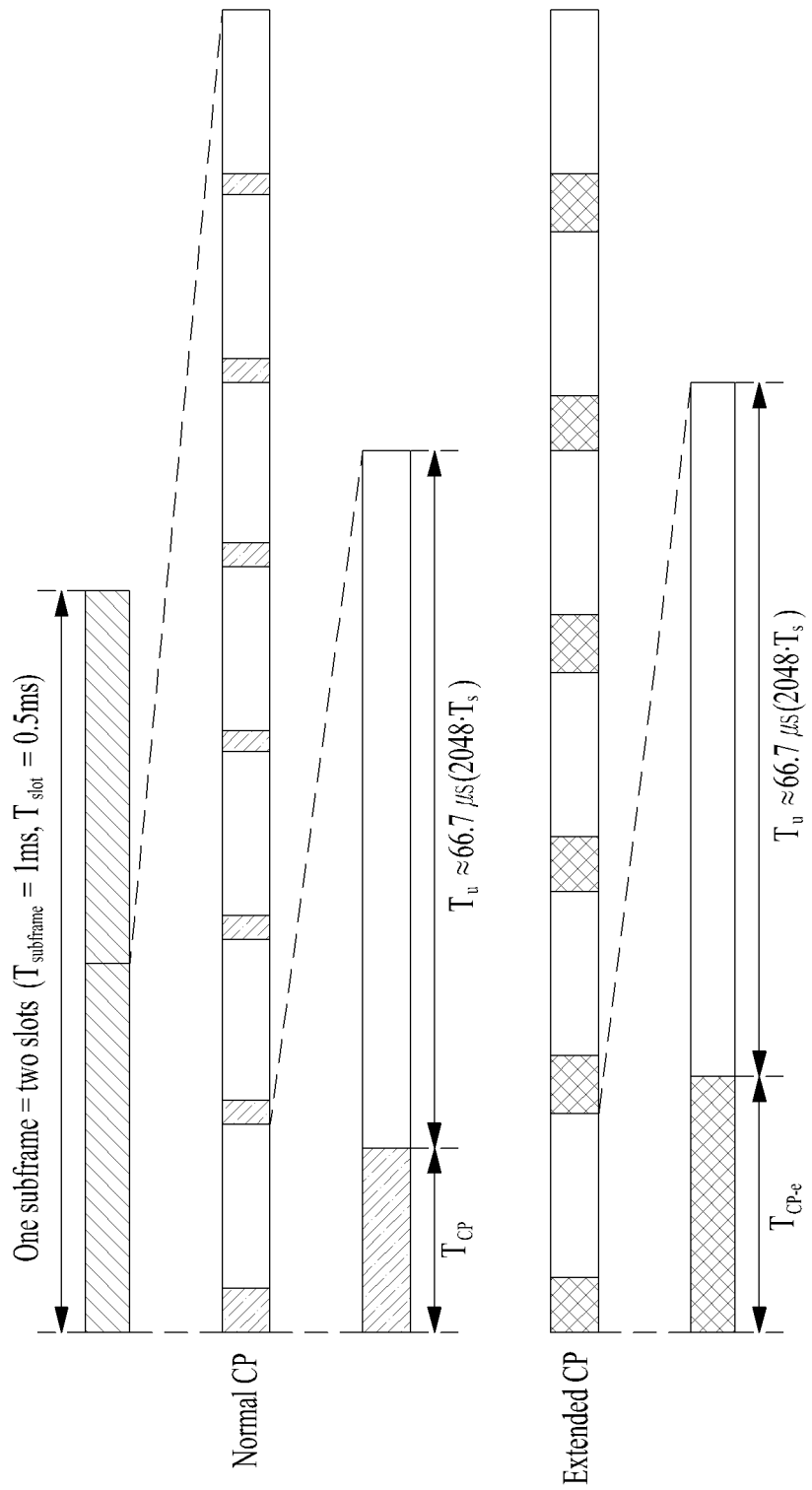
FIG. 6 is a diagram for configurations of symbols used in a wireless access system.

FIG. 6 is a diagram illustrating a configuration of a symbol that can be used in embodiments of the present invention.

The embodiments of the present invention can support two types of frame configurations as illustrated in FIG. 6 in order to support various scenarios of a cellular system by an LTE/LTE-A system.

An LTE/LTE-A system is designed to cover indoor, downtown, suburb, and province environments, and moving speed of a UE is considered as 350 to 500 km. In general, a center frequency at which an LTE/LTE-A system is managed is 400 MHz to 4 GHz and an available frequency band is 1.4 to 20 MHz. This means that delay spread and Doppler's frequency may be changed according to center frequency and available frequency band.

Referring to FIG. 6, in the case of normal cyclic prefix (CP), subcarrier spacing $\Delta f$=15 kHz and CP is about 4.7 us. In addition, in the case of extended CP, subcarrier spacing is the same and CP is about 16.7 us. The extended CP can support a wide range of cell installed in a relatively wide suburb or province due to a long CP duration.

In general, a cell installed in a suburb or a province has a long length of delay spread, an extended CP having a relatively long duration is necessary to definitely overcome inter-symbol interference (ISI). However, due to increase in relative overhead compared with a normal CP, trade-off whereby loss on spectral efficiency/transmission resource occurs is present.

Accordingly, in order to support all the cell arrangement scenarios, the LTE/LTE-A system fixes and uses values of normal CP/extended CP and uses the following design standard for determination of a length of a CP.

$T_{CP} \geq T_d$ to prevent *ISI*, $\dfrac{f_{d_{max}}}{\Delta f} \ll 1$ to keep *ICI* due to Doppler sufficiently low, $T_{CP} \Delta f \ll 1$ for spectral efficiency.

In this case, $T_{CP}$ refers to time duration of a CP, $T_d$ refers to delay spread duration, and $\Delta f$ refers to subcarrier spacing. In addition, $f_{dmax}$ refers to a maximum Doppler spread value.

1.2 Reference Signal (RS)

Hereinafter, reference signals that can be used in embodiments of the present invention will be described.

Figure 7:
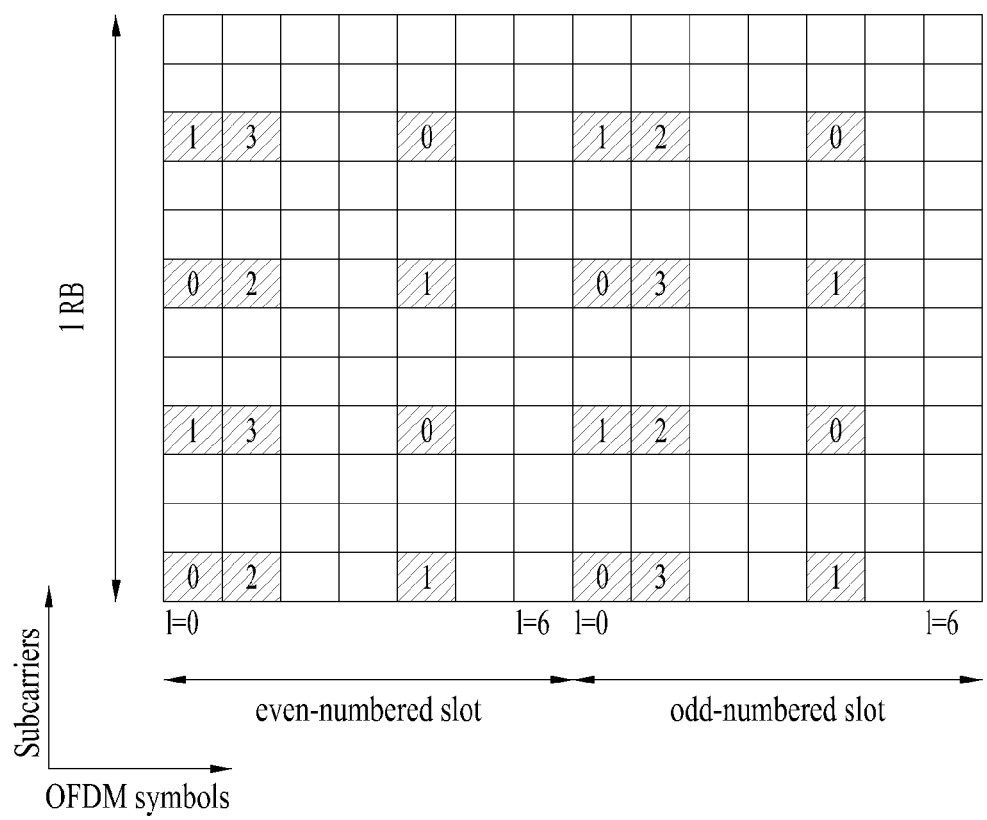
FIG. 7 is a diagram for one example of a subframe having CRS (cell specific reference signal) used in a wireless access system assigned thereto.

FIG. 7 is a diagram illustrating an example of a subframe to which a cell specific reference signal (CRS) is allocated, which can be used in embodiments of the present invention.

FIG. 7 illustrates an allocation structure of the CRS when the system supports 4 antenna. In an existing 3GPP LTE/LTE-A system, since CRSs are used for both demodulation and measurement, the CRSs are transmitted in all DL subframes in a cell supporting PDSCH transmission and are transmitted through all antenna ports configured at an eNB.

More specifically, CRS sequence $r_{l,n_s}(m)$ is mapped to complex-valued modulation symbols $a_{k,l}^{(p)}$ used as reference symbols for antenna port p in slot ns according to the following Equation 1.

$$a_{k,l}^{(p)} = r_{l,n_s}(m')$$ [Equation 1]

Where $n_s$ is the slot number in a radio frame, and l is the OFDM symbol number within the slot, which is determined according to the following Equation 2.

$$k = 6m + (v + v_{shift}) \bmod 6$$ [Equation 2]

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

Where k denotes a subcarrier index, l denotes an OFDM symbol index, and $N_{RB}^{max,DL}$ denotes the largest DL bandwidth configuration, expressed as an integer multiple of $N_{BL}^{RB}$. Parameters v and $v_{shift}$ define locations for different RSs in the frequency domain and v is given as follows $$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$ [Equation 3]

The cell-specific frequency shift $V_{shift}$ is given by a physical layer cell identity $N_{ID}^{cell}$ as follows.

$$v_{shift} = N_{ID}^{cell} \bmod 6$$ [Equation 4]

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 8:
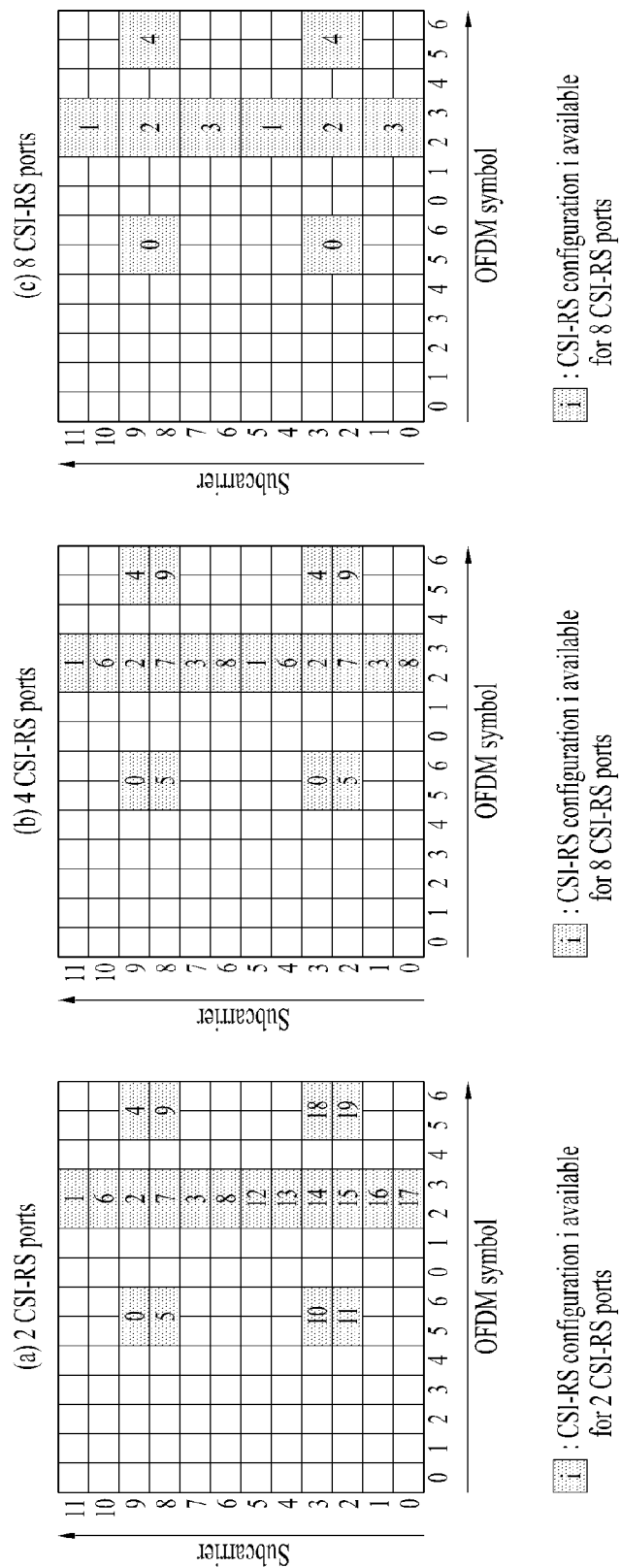
FIG. 8 is a diagram for examples of subframes having CSI-RSs used in a wireless access system assigned thereto in accordance with the number of antenna ports.

FIG. 8 is a diagram illustrating an example of subframes in which CSI-RSs that can be used in embodiments of the present invention are allocated according to the number of antenna ports.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence $r_{l,n_s}(m)$ is mapped to complex modulation symbols $a_{k,l}^{(p)}$ used as RSs on antenna port p according to the following Equation 5.

$$a_{k,l}^{(p)} = w_{l''} \cdot r_{l,n_s}(m')$$ [Equation 5]

where $w_{l''}$, k, l are given by the following Equation 6.

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases}$$ [Equation 6]

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, normal cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

Where (k', l') and necessary conditions on ns are given by Table 2 and Table 3 in a normal CP and an extended CP, respectively. That is, CSI-RS configurations of Table 2 and Table 3 denote locations of REs occupied by a CSI-RS of each antenna port in an RB pair.

TABLE 2

| CSI reference signal configuration | | Number of CSI reference signals configured | | | | | |
|---|---|---|---|---|---|---|---|
| | | 1 or 2 | | 4 | | 8 | |
| | | (k', l') | $n_S$ mod 2 | (k', l') | $n_S$ mod 2 | (k', l') | $n_S$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 3

| CSI reference signal configuration | | Number of CSI reference signals configured | | | | | |
|---|---|---|---|---|---|---|---|
| | | 1 or 2 | | 4 | | 8 | |
| | | (k', l') | $n_S$ mod 2 | (k', l') | $n_S$ mod 2 | (k', l') | $n_S$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

FIG. 8(a) illustrates 20 CSI-RS configurations 0 to 19 available for CSI-RS transmission through two CSI-RS ports among the CSI-RS configurations of Table 2, FIG. 8(b) illustrates 10 available CSI-RS configurations 0 to 9 through four CSI-RS ports among the CSI-RS configurations of Table 2, and FIG. 8(c) illustrates 5 available CSI-RS configurations 0 to 4 through 8 CSI-RS ports among the CSI-RS configurations of Table 2.

The CSI-RS ports refer to antenna ports configured for CSI-RS transmission. For example, referring to Equation 6, antenna ports 15 to 22 correspond to the CSI-RS ports. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 2 or Table 3 but also with subframes in which CSI-RSs are configured.

Meanwhile, if subframes for CSI-RS transmission differ even when CSI-RS configuration numbers are the same in Table 2 or Table 3, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration number of Table 2 or Table 3 is assigned and (2) a CSI-RS configuration varying according to a CSI-RS configuration number of Table 2 or Table 3, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration ICSI-RS, UE assumption on reference PDSCH transmitted power for CSI feedback Pc, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 8 shows CSI-RS subframe configuration $I_{CSI-RS}$ according to $T_{CSI-RS}$ and $\Delta_{CSI-RS}$.

TABLE 4

| CSI-RS-SubframeConfig ICSI-RS | CSI-RS periodicity TCSI-RS (subframes) | CSI-RS subframe offset ΔCSI-RS (subframes) |
| --- | --- | --- |
| 0-4 | 5 | ICSI-RS |
| 5-14 | 10 | ICSI-RS-5 |
| 15-34 | 20 | ICSI-RS-15 |
| 35-74 | 40 | ICSI-RS-35 |
| 75-154 | 80 | ICSI-RS-75 |

Subframes satisfying the following Equation 7 are subframes including CSI-RSs.

$$(10n_f + \lfloor n_s/2 \rfloor - \Delta_{CSI-RS}) \bmod T_{CSI-RS} = 0 \quad [\text{Equation 7}]$$

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

Figure 9:
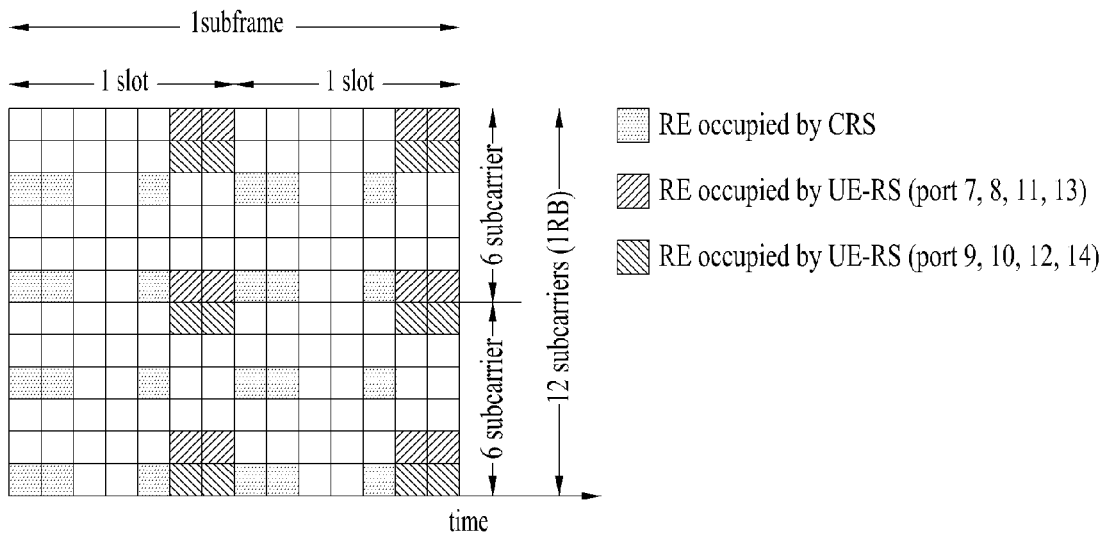
FIG. 9 is a diagram for one example of a subframe having a UE-specific reference signal (UE-RS) used in a wireless access system assigned thereto.

FIG. 9 is a diagram illustrating an example of UE-specific reference signals (UE-RSs) that can be used in embodiments of the present invention.

Referring to FIG. 9, the subframe illustrates REs occupied by UE-RSs among REs in one RB of a normal DL subframe having a normal CP.

UE-RSs are transmitted on antenna port(s) p=5, p=7, p=8 or p=7, 8, . . . , υ+6 for PDSCH transmission, where υ is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 13, in a PRB having frequency-domain index nPRB assigned for PDSCH transmission with respect to p=7, p=8, or p=7, 8, . . . , υ+6, a part of UE-RS sequence r(m) is mapped to complex-valued modulation symbols $a_{k,l}^{(p)}$ in a subframe according to the following Equation 8.

$$a_{k,l}^{(p)} = w_p(l') \cdot r(3 \cdot l' \cdot N_{RB}^{max,DL} + 3 \cdot n_{PRB} + m') \quad [\text{Equation 8}]$$

where $w_p(i)$, l', m' are given as following Equation 14.

[Equation 9]

$$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in a special subframe with configuration 1, 2, 6, or 7 (see Table 2)} \\ 2, 3 & \text{if } n_s \bmod 2 = 1 \text{ and not in a special subframe with configuration 1, 2, 6, or 7 (see Table 2)} \end{cases}$$

$$m' = 0, 1, 2$$

where the sequence $\overline{w}_p(i)$ for the normal CP is given according to the following table 5.

TABLE 5

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port $p \in \{7, 8, \ldots, \upsilon+6\}$, the UE-RS sequence r(m) is defined as following Equation 10.

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

[Equation 10]

c(i) is a pseudo-random sequence defined by a length-31 Gold sequence. The output sequence c(n) of length MPN, where n=0, 1, . . . , MPN−1, is defined by the following Equation 11.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 11]}$$

Where $N_C=1600$ and the first m-sequence is initialized with $x_1(0)=1$, $x_1(n)=0$, n=1, 2, . . . , 30. The initialization of the second m-sequence is denoted by $c_{init}=\Sigma_{i=0}^{30}x_2(i)\cdot 2^i$ with the value depending on the application of the sequence.

In Equation 11, the pseudo-random sequence generator for generating c(i) is initialized with $c_{init}$ at the start of each subframe according to the following Equation 12.

$$c_{init}=(\lfloor n_s/2 \rfloor+1)\cdot(2N_{ID}^{cell}+1)\cdot 2^{16}+n_{SCID} \quad \text{[Equation 12]}$$

Where $n_{SCID}$ is 0 unless specified otherwise and is given by DCI format 2B or 2C associated with PDSCH transmission with respect to PDSCH transmission on antenna port 7 or 8. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

As can be appreciated from Equations 12 to 16, UE-RSs are transmitted through antenna port(s) corresponding respectively to layer(s) of a PDSCH. That is, according to Equations 12 to 16, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a PR pair are the same with respect to a UE-RS port regardless of a UE or a cell.

As a result, the number of DMRS REs in an RB to which a PDSCH for a specific UE in a specific subframe is mapped is the same. Notably, in RBs to which the PDSCH for different UEs in the same subframe is allocated, the number of DMRS REs included in the RBs may differ according to the number of transmitted layers.

2. Wireless Access System Supportive of Massive MIMO 2.1 Massive MIMO

Massive MIMO has been devised in order to eliminate effects of ICI (intra-cell interference) and noise in a manner of maximizing a beam gain using a number of antennas. A different transmission scheme may be applied depending on a duplex scheme such as TDD (time division duplex) or FDD (frequency division duplex) in order to apply the massive MIMO system to a downlink or uplink transmission in a cellular network.

According to the TDD scheme, transmission intervals are distinguished by time from each other although a frequency band used in downlink is identical to the frequency band used in uplink. Therefore, if a coherent time of a radio channel is significant, i.e., Doppler Effect is insignificant or a user equipment has a low speed, it may be assumed that a radio channel characteristic of downlink is identical to that of uplink. This is called reciprocity. Thus, a base station may perform a channel estimation using reference signals (RSs) of user equipments transmitted in uplink and transmit downlink data using an estimated channel information in downlink transmission. In particular, since the base station does not need to transmit a separate downlink RS in order to obtain a downlink channel information, the base station can have a benefit in aspect of resource overhead. Moreover, since it is not necessary for the massive MIMO using a number of the antennas to use RSs amounting to the number of transmitting antennas, it may become a great benefit.

According to the FDD scheme, a frequency used as the transmission interval in downlink is different from a frequency used as the transmission interval in uplink. On the other hand, in case of the TDD, a gap for a transition guard time should be included in a frame structure in consideration of a round trip delay. In particular, the transition guard time becomes great if cell coverage of the base station is wide, thereby causing throughput degradation. Hence, compared to the FDD, the TDD system has a restriction on the cell coverage.

Moreover, in case of the TDD system, the same DL/UL configuration between each of base stations should be considered in order to control an interference effect between adjacent base stations. And, the TDD system has a restrictive condition that DL/UL transmission synchronization should be performed between base stations. The above mentioned restrictive conditions of the TDD system may cause the duplex scheme of the massive MIMO to be considered in the FDD system. However, different from the TDD system, the FDD system has disadvantages that the base station should mandatorily transmit the downlink RS in order to obtain the channel information on downlink and that the base station should receive feedback on the channel state information from a user equipment.

In the following, various embodiments for solving possible problems caused by applying the massive MIMO to the FDD system are described. The embodiments may be also applied to a case of the TDD system in which the reciprocity is not valid and to a case that a user equipment should provide the feedback on the downlink channel Therefore, the embodiments of the present invention can be applied to both of the FDD system and the TDD system.

2.2 Problem of Massive MIMO

Assume that the number of antennas operated in a base station amounts to 100 and that each of all the antennas is used for beamforming. In this case, the number of necessary resource elements (REs) (cf. FIG. 3), which are used for transmitting RS by a base station, is equal to or greater than 100. For instance, in LTE system, 4 (single antenna), 8 (two antennas) or 12 (four antennas) REs are used for a CRS transmission within a single RB (resource block) (cf. FIG. 7) and 8 (eight antennas) REs are used for a CSI-RS transmission (cf. FIG. 8).

Thus, in order to apply massive MIMO, a RS configuration (i.e., the ratio of the number of antennas to the number of RSs is equal to 1:1) equal to a CSI-RS configuration is used. And, in case that one RB (i.e., 12 subcarriers×7 OFDM symbols=84 REs) is assumed to be a minimum scheduling unit, 100 RSs for the massive MIMO cannot be transmitted in a single RB. Moreover, in case that 6 RBs are assumed to be the minimum scheduling unit, it may cause a serious overhead (about 20%) since 100 REs should be used as the RSs in 6 RBs (i.e., 504 REs).

The problem occurring as a result of increase in the number of antennas in the massive MIMO system causes overhead related to an amount of feedback on a channel state information of a user equipment and overhead in designing a codebook as well as the RS overhead. Moreover, as the number of transmitting antennas of a base station increases, the codebook should be designed based on a number of mathematical/experimental data. For instance, in order to use codebook-based closed loop MIMO, the number of dimensions, which should be indicated by the codebook, increases as the number of the antennas increases. Furthermore, since precoding matrices should be designed to operate in all possible channels robustly, a size of the codebook becomes significantly great.

Further, a user equipment should perform a number of calculations to calculate an appropriate PMI (precoding matrix index) within the codebook. And, the amount of a feedback information or an information bit number is increased due to increase in the size of the codebook in proportion to the number of the antennas.

Thus, the process for feedback on a channel state information on downlink, which is performed on each of the antennas by a user equipment, is not appropriate for the massive MIMO considering a number of antennas. Hence, a new type of a closed loop MIMO scheme is required.

2.3 Spatial Correlation

In massive MIMO, a number of antennas have a short distance between the antennas due to restriction put on a space and it may cause a high correlation value or high spatial correlation value between the antennas. The antenna correlation corresponds to a value that may be changed depending on AOA (angle of arrival) of a transmission signal, an AS (azimuth spread) value of a signal (or, AS (angle spread) value) and/or a distance between antennas. Therefore, the spatial correlation (or antenna correlation) has a high value if the angle of arrival is great, the AS value is low, or the distance between the antennas is short.

Figure 10:
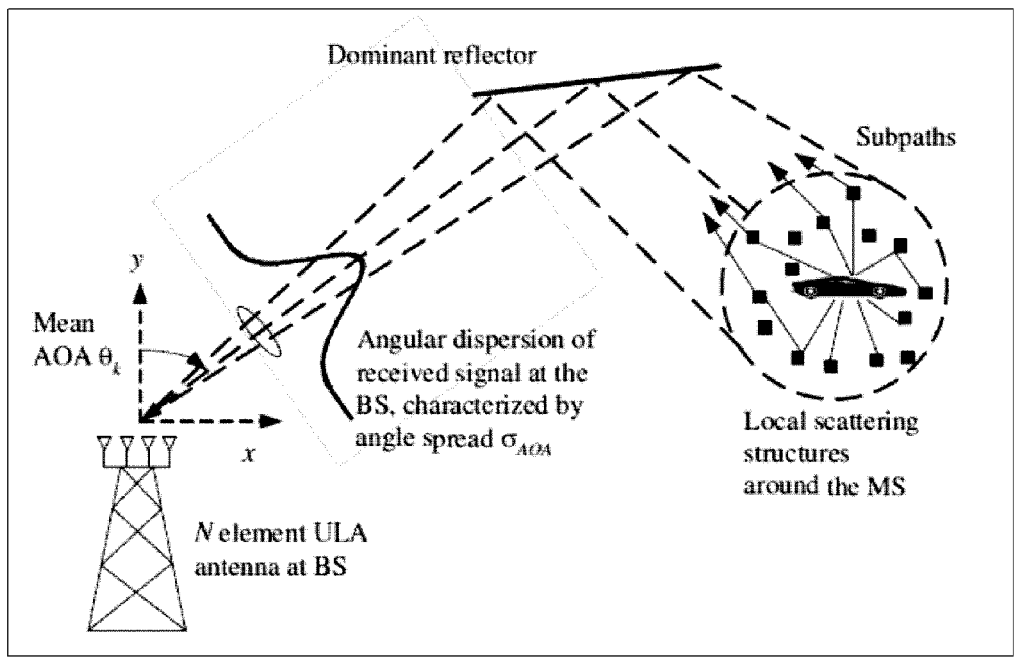
FIG. 10 is a conceptual diagram of AOA and AS related to spatial correlation in uplink.

FIG. 10 is a conceptual diagram of AOA and AS related to spatial correlation in uplink.

Consider a case that a signal transmitted from a user equipment is received by a base station through a reflector. In FIG. 10, assume that the user equipment is placed in such a high-speed transportation as a vehicle or the like and that the base station is fixed at a prescribed location. In this case, an average value of angles of arrival of signals, which are transmitted from the user equipment, received by $k^{th}$ antenna of the base station corresponds to AOA ($\theta_k$). Moreover, in this case, a dispersion value for each of the signals (sub-path) corresponds to AS ($\sigma_{AOA}$). In case of downlink, the concept mentioned with reference to FIG. 10 may correspond to a signal received by a user equipment instead of a signal received by a base station.

In FIG. 10, a spatial correlation value between $p^{th}$ antenna and $n^{th}$ antenna may be represented as Formula 13 in the following.

$$\rho_s = |R_s(n,p)|^2 = |\Re\{(R_s(n,p)\} + j\Im\{(R_s(n,p)\}|^2 \quad [\text{Formula 13}]$$

In this case, depending on with which distribution the AOA is constructed, values included in the Formula 13 are given as follows. Although an antenna configuration is assumed to be ULA (uniform linear array) in the present invention, the present invention may be applied to various types of antenna configurations such as UCA (uniform circle array), 2-dimension rectangular array and the like.

In case of uniform distribution, the constituents of the Formula 13 can be defined as Formula 14 in the following.

$$\Re\{R_s(n, p)\} = J_0(Z_{np}) + 2\sum_{v=1}^{\infty} J_{2v}(Z_{np})\cos(2v\theta)\text{sinc}(2v\Delta) \quad [\text{Formula 14}]$$

$$\Im\{R_s(n, p)\} = 2\sum_{v=0}^{\infty} J_{2v+1}(Z_{np})\sin[(2v + 1)\theta]\text{sinc}[(2v + 1)\Delta]$$

In Formula 14, $Z_{np} = 2\pi|p-n|d/\lambda$, d is a distance between antennas, $\lambda$ is a wavelength, $\theta$ is an average value of AOAs, and $\Delta = \sqrt{3} \cdot \sigma_{AOA}$ to mean a scattering angle, $J_n(x)$ is $n^{th}$ Bessel Function and $$\text{sinc}(x) = \frac{\sin(x)}{x}.$$

In case of Gaussian distribution, the constituents of Formula 13 can be defined as Formula 15 in the following.

$$\Re\{R_s(n, p)\} = \quad [\text{Formula 15}]$$

$$J_0(Z_{np}) + 2C_g \sum_{v=1}^{\infty} J_{2v}(Z_{np})\cos(2v\theta)\exp(-2v^2\sigma_{AOA}^2)$$

$$\Re\left\{\text{erf}\left(\frac{\pi + j2v\sigma_{AOA}^2}{\sqrt{2}\,\sigma_{AOA}}\right)\right\}$$

$$\Im\{R_s(n, p)\} =$$

$$2C_g \sum_{v=0}^{\infty} J_{2v+1}(Z_{np})\sin[(2v + 1)\theta]\exp\left[\frac{-(2v + 1)^2 \sigma_{AOA}^2}{2}\right]$$

$$\Re\left\{\text{erf}\left(\frac{\pi + j(2v + 1)\sigma_{AOA}^2}{\sqrt{2}\,\sigma_{AOA}}\right)\right\}$$

In Formula 15, $$C_g = \frac{1}{\text{erf}(\pi/\sqrt{2}\,\sigma_{AOA})}$$

and $$\text{erf}(x) = 2/(\sqrt{\pi}) \int_0^x e^{-t^2} dt.$$

In case of Laplacian distribution, the constituents of the Formula 13 can be defined as Formula 16 in the following.

$$\Re\{R_s(n, p)\} = J_0(Z_{np}) + 2\sum_{v=1}^{\infty} J_{2v}(Z_{np})\frac{a^2}{a^2 + 4v^2}\cos(2v\theta)$$ [Formula 16]

$$\Im\{R_s(n, p)\} = -2\sum_{v=0}^{\infty} J_{2v+1}(Z_{np})\frac{a}{a^2 + (2v+1)^2} \cdot$$

$$\frac{1 + \exp(-a\pi)}{1 - \exp(-a\pi)}\sin[(2v+1)\theta]$$

In Formula 16, a is an attenuation constant of the Laplacian distribution and has relevance to an angel spread (AS) or an AS value. In particular, the AS has a small value if a is large.

A base station and/or a user equipment can configure a correlation matrix using the correlation function mentioned with reference to Formulas 13 to 16. A method of configuring the correlation function can be obtained through a correlation coefficient, $\rho_{np} = \sqrt{\Re\{R_s(n,p)\}^2 + \Im\{R_s(n,p)\}^2}$. The correlation coefficient can be expressed in the form of a complex number.

If a value of the correlation coefficient is given and the number of transmitting antennas is set to 4, the correlation matrix can be calculated as Formula 17 in the following.

$$R_h = \begin{bmatrix} \rho_{11} & \rho_{12} & \rho_{13} & \rho_{14} \\ \rho_{21} & \rho_{22} & \rho_{23} & \rho_{24} \\ \rho_{31} & \rho_{32} & \rho_{33} & \rho_{34} \\ \rho_{41} & \rho_{42} & \rho_{43} & \rho_{44} \end{bmatrix}$$ [Formula 17]

FIGS. 11 to 14 are diagrams of spatial correlation values in case of both uniform distribution of AOA and Gaussian distribution of AOA.

Referring to FIG. 11 and FIG. 12, spatial correlation values can be checked in case that an average value of AOAs corresponds to each of 0 and 30 degrees. Referring to FIG. 13 and FIG. 14, the spatial correlation values can be checked in case that the average value of the AOAs corresponds to each of 60 and 90 degrees. In particular, the spatial correlation value becomes high if the AOA average value is high, an AS value is low, or a distance between antennas is short. It shows good performance in case of beamforming but poor performance in spatial multiplexing.

FIGS. 15 to 19 are diagrams for magnitude values of channel responses for antennas in accordance with angle spread (AS) values.

Figure 17:
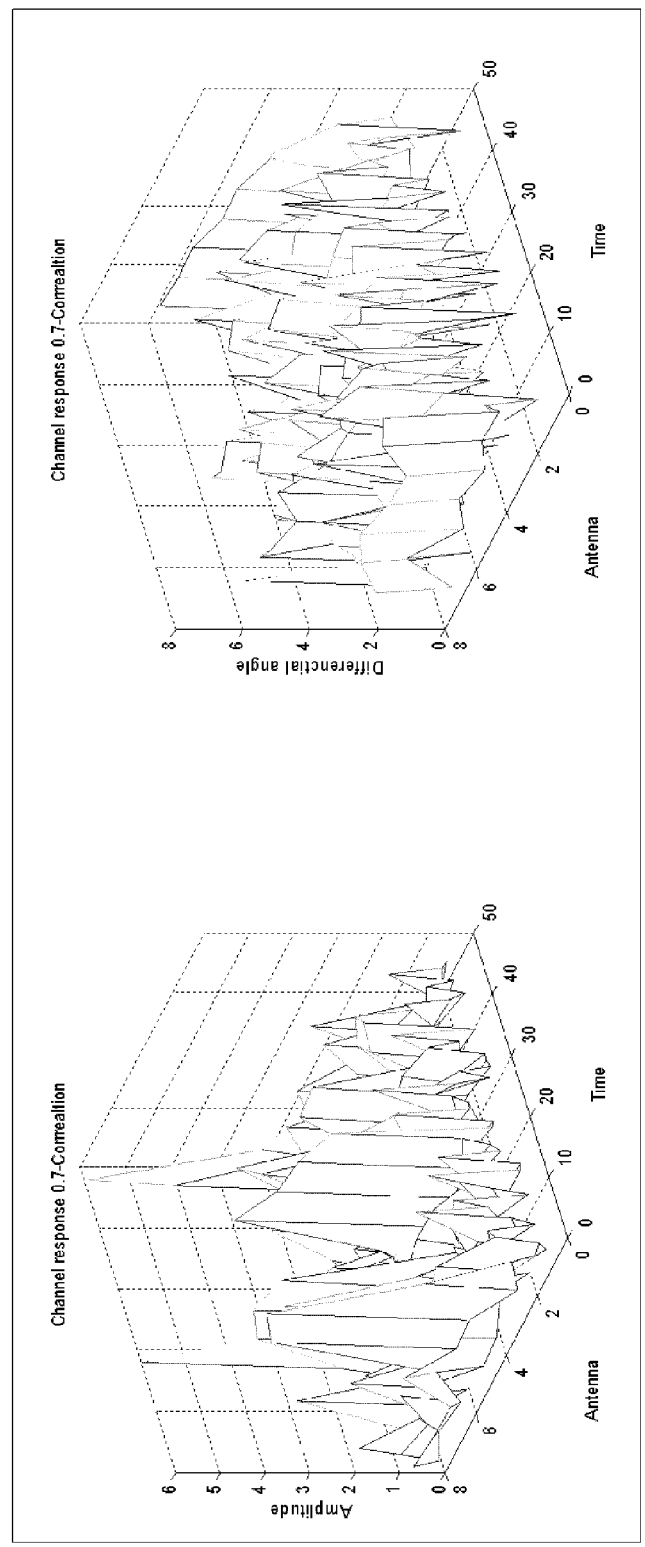
Figure 18:
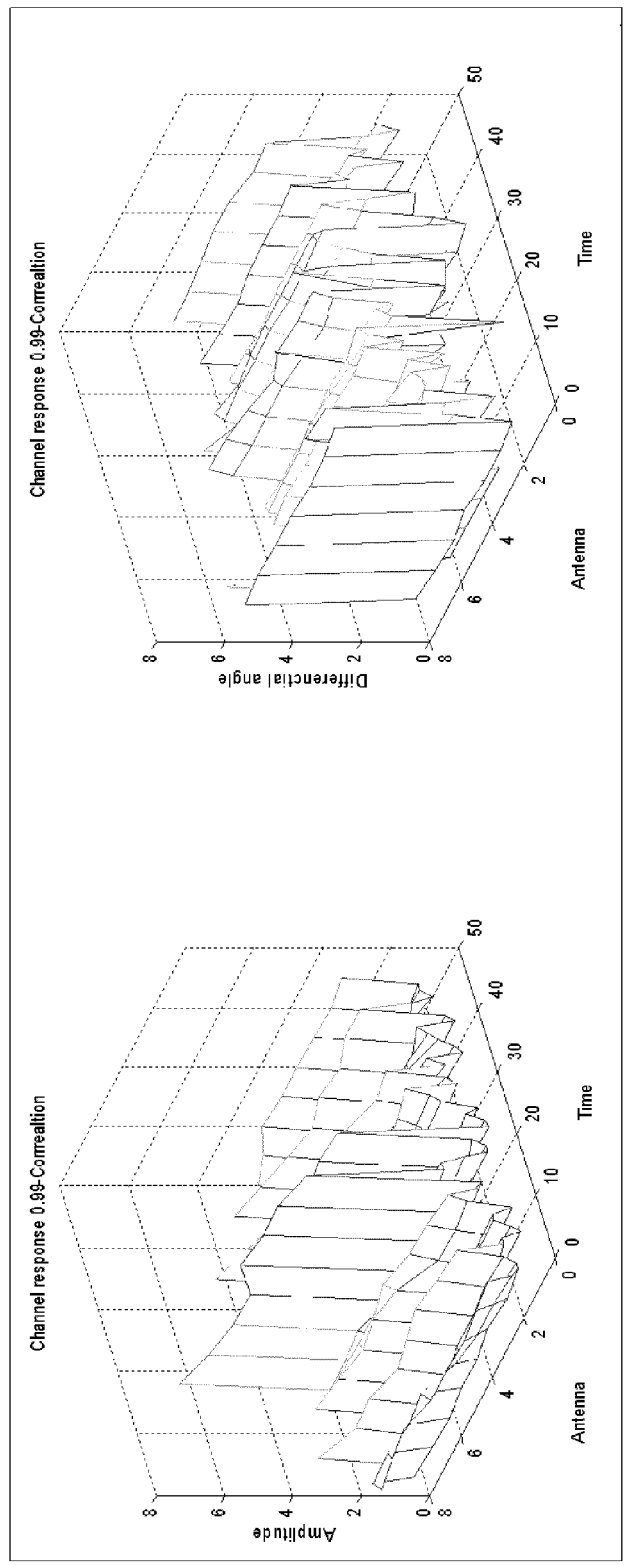
Figure 19:
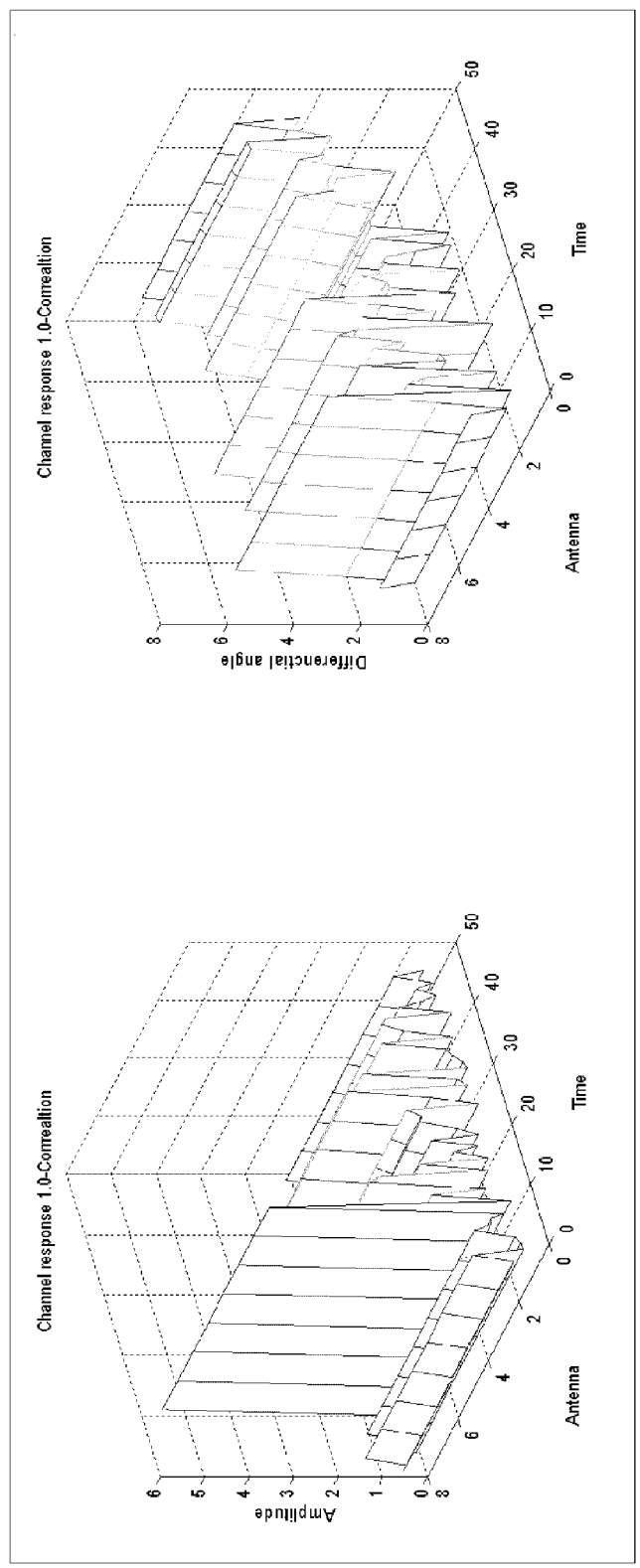

If a spatial correlation has a high value, magnitude/amplitude values of channel responses have similar characteristics. FIG. 15 and FIG. 16 show channel response magnitudes for each of antennas in accordance with angle spread ($\sigma_{AOA}$) values in case that the total number of the antennas is 4. Moreover, FIG. 17, FIG. 18 and FIG. 19 show channel response amplitudes for each of antennas and angle differences between each of antennas in accordance with correlation values of 0.7, 0.99 and 1.0.

Therefore, a spatial correlation value becomes high if $\sigma_{AOA}$ has a low value. And, all channel responses for each of the antennas have similar characteristics. In particular, in case that the value of $\sigma_{AOA}$ corresponds to 0, channel response magnitudes of all antennas are equal to each other. Moreover, angle values of channel responses have the same angle differences between each of antennas.

3. CSI Transceiving Method in Massive MIMO System

The embodiments of the present invention are based on a feature that magnitude values of channel responses for each of antennas or angle differences are similar to each other in case that a spatial correlation between a number of antennas has a high value. According to the embodiments of the present invention, a channel response for downlink can be calculated without transmitting RS in order for all antennas to perform transmissions in downlink.

For instance, a base station transmits RSs through a prescribed number of antennas only and a user equipment calculates $1^{st}$ channel responses for the antennas, which have transmitted the RSs. And, the user equipment can estimate $2^{nd}$ channel responses for the antennas, which have not transmitted the RSs. In this case, antennas transmitting RSs among massive MIMO antennas are called a $1^{st}$ antenna set or a $1^{st}$ set and antennas not transmitting RSs among the massive MIMO antennas are called a $2^{nd}$ antenna set or a $2^{nd}$ set.

In case of the $1^{st}$ channel responses, a user equipment can calculate the $1^{st}$ channel responses based on RSs transmitted through corresponding antennas. However, since RSs are not transmitted in case of the $2^{nd}$ channel responses, methods of estimating channels for antennas included in the $2^{nd}$ antenna set are required.

3.1 Channel Estimating Method for $2^{nd}$ Antenna Set 3.1.1 Interpolation

Radio channels for a $2^{nd}$ antenna set can be estimated in a manner of performing interpolation on radio channels estimated through a $1^{st}$ antenna set. Linear interpolation, interpolation of second-order polynomial, or interpolation of higher-order such as cubic spline may be used for the interpolation.

When the interpolation is performed, the interpolation can be independently performed on each of real and imaginary numbers of channel responses estimated using RSs of the $1^{st}$ antenna set.

Alternatively, channel responses of the $1^{st}$ antenna set are divided into magnitudes and angles respectively and the interpolation can be independently performed on each of the magnitudes and angles.

3.1.2 Minimum mean square error (MMSE) Estimating Method

A user equipment and/or a base station can perform a channel estimation on a $2^{nd}$ antenna set through an MMSE estimation if being aware of a correlation function between antennas. The following Formula 18 can be used to perform the MMSE estimation.

$$\hat{H} = R_{H\tilde{H}}R_{\tilde{H}\tilde{H}}^{-1}\tilde{H} = R_{H\tilde{H}}\left(R_{HH} + \frac{1}{SNR}I\right)^{-1}\tilde{H}$$ [Formula 18]

In Formula 18, H corresponds to a channel vector estimated for a $1^{st}$ antenna set, $R_{H\tilde{H}}$ denotes a cross correlation vector between the $1^{st}$ antenna set and $2^{nd}$ antenna set, and $R_{HH}$ denotes an auto correlation vector between channels estimated through the $1^{st}$ antenna set.

In particular, elements of variance matrices $R_{H\tilde{H}}$ and $R_{HH}$ indicates correlation values between different antennas. A correlation value between $p^{th}$ antenna and $n^{th}$ antenna can be expressed as Formula 19 in the following.

$$E[h_p\tilde{h}_n^*] = E[h_p h_n^*] = R_s(n,p)$$ [Formula 19]

In Formula 19, $R_s$ (n,p) corresponds to a correlation function for each antenna and can be defined as Formulas 14, 15 and 16 in accordance with distribution of AOA. The Formulas 14, 15 and 16 correspond to correlation functions for uniform distribution, Gaussian distribution and Laplacian distribution, respectively. Each of correlation functions can be used in case that the corresponding distribution is assumed. Alternatively, the MMSE estimation can be performed in a manner of simplifying the above correlation functions.

3.2 Channel State Information (CSI) Obtaining Method

A user equipment can perform a channel estimation on a $1^{st}$ antenna set using a received RS and then obtain a channel state information (CSI). And, the user equipment can perform the channel estimation on a $2^{nd}$ antenna set using methods mentioned with reference to 3.1 and then obtain the channel state information. In the following, methods for a user equipment to obtain CSIs for both a $1^{st}$ antenna set and a $2^{nd}$ antenna set are described.

In the following, for clarity, assume a case that a base station has the total N number of transmitting antennas used for downlink transmissions. Moreover, assume that the number of antennas included in a $1^{st}$ antenna set transmitting RSs corresponds to M and that the number of antennas included in a $2^{nd}$ antennas set not transmitting RSs corresponds to J. Furthermore, assume that the number of layers corresponds to L.

3.2.1 CSI for $1^{st}$ Antenna Set-1

A user equipment can feedback CSI for a $1^{st}$ antenna set to a base station. In this case, the CSI can include CQI, PMI and RI all together. The PMI corresponds to a precoding matrix for the $1^{st}$ antenna set and the precoding matrix can be expressed as M×L matrix. Moreover, since the CQI corresponds to a channel quality information for the $1^{st}$ antenna set, the CQI can be calculated using M of RSs. In case of the RI, it may be transmitted implicitly or explicitly in a manner of being expressed as the number of layers of a selected PMI.

Thus, in case of feeding back the CSI for the $1^{st}$ antenna set, the user equipment can transmit a quantized CQI value and quantized PMI value. Particularly, in case of the PMI, the PMI can be configured with a precoding matrix, which can be transmitted most efficiently, among precoding matrices within a codebook. In particular, when a precoding matrix is defined as W, a channel value for a $1^{st}$ antenna set is defined as H, and a codebook set is defined as C, $\hat{W}$ for satisfying the Formula 20 can be calculated as follows.

$$\hat{W} = \arg\max_{W \in C} \|W * H\|_F^2 \quad \text{[Formula 20]}$$

Alternatively, in case of feeding back the CSI for the $1^{st}$ antenna set, the user equipment can transmit a non-quantized CQI value and non-quantized PMI value. Particularly, in case of the PMI, the PMI can be configured with a channel response value for the $1^{st}$ antenna set instead of the precoding matrix.

3.2.2 CSI for $1^{st}$ Antenna Set-2

A user equipment can transmit magnitude difference values (difference magnitudes) and/or angle difference values between adjacent antennas to a base station as another aspect of section 3.2.1. However, since the magnitude difference values and/or angle difference values differ in each of the antennas, transmissions of all magnitude difference values and/or angle difference values are disadvantageous in aspect of feedback overhead.

The user equipment can transmit one or more representable values in order to avoid the above-mentioned disadvantage. For instance, if there is a high spatial correlation, the magnitude difference values or angle difference values are similar to each other since channel responses between antennas becomes similar to each other. Thus, the user equipment can calculate an average value for the magnitude difference values and/or angle difference values and then transmit the average value to the base station.

Alternatively, the user equipment can feedback magnitude difference values and/or angle difference values between specific antennas only.

Thus, in case of feeding back the magnitude difference values and/or angle difference values to the base station, the user equipment can feedback quantized magnitude difference values and/or quantized angle difference values to the base station.

Alternatively, the user equipment can feedback non-quantized magnitude difference values and/or non-quantized angle difference values to the base station.

3.2.3 CSI for $2^{nd}$ Antenna Set

Figure 20:
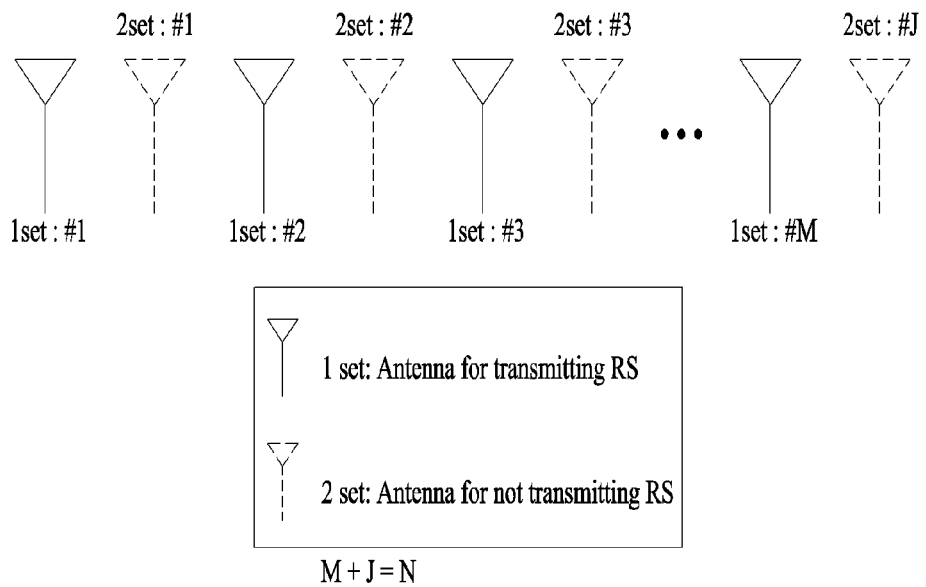
FIG. 20 is a diagram for one of configuring methods for both a $1^{st}$ antenna set and a $2^{nd}$ antenna set.

FIG. 20 is a diagram for one of configuring methods for both a $1^{st}$ antenna set and a $2^{nd}$ antenna set.

A user equipment can configure CQI and PMI for a $2^{nd}$ antenna set and then transmit the configured CQI and PMI to a base station. Referring to FIG. 20, in case that M of RSs corresponding to a $1^{st}$ antenna set of total N antennas are transmitted as a comb type, a lattice structure or a stepping stone structure, there are J antennas that do not transmit RSs. In the following description, assume that M=J and M+J is equal to the total number of antennas, N.

In this case, CQI and PMI for a $2^{nd}$ antenna set can be configured with CQI and PMI for antennas of the $1^{st}$ antenna set most adjacent to a random antenna of the $2^{nd}$ antenna set. For instance, referring to FIG. 20, CQI and PMI for antenna #1 of the $1^{st}$ antenna set can be configured with CQI and PMI for antenna #1 of the $2^{nd}$ antenna set.

In this case, the PMI is configured with (N/M)×L of a precoding matrix. And, PMIs amounting to the M number of RSs exist. However, if spatial correlation is high, the user equipment does not feedback all M of PMIs but can transmit one or more representable PMIs only. The reason is that M of PMIs have the same precoding matrix since magnitude difference values and/or angle difference values between each of antennas are similar to each other.

3.2.4 RS for $2^{nd}$ Antenna Set

As another aspect of the present invention, a base station can be configured to transmit a cell-specific RS (e.g., CRS) through a $1^{st}$ antenna set only and to transmit a UE-specific RS (e.g., CSI-RS) through a $2^{nd}$ antennas set only. In case that RSs are transmitted through both of the $1^{st}$ antenna set and the $2^{nd}$ antenna set, RS overhead or feedback overhead may be increased. However, in case of the RS for the $2^{nd}$ antenna set, overhead can be minimized in a manner of configuring RS to be transmitted only when the base station makes a request at a specific time.

In this case, when the UE-specific RSs are transmitted through the $2^{nd}$ antenna set, the base station can inform the user equipment of an information on the corresponding time (e.g., frame index, subframe index, etc.) and a reporting period information through upper layer signaling. Thus, the user equipment can accurately measure CSI for each of the $1^{st}$ antenna set and the $2^{nd}$ antenna set and report a $1^{st}$ CSI and/or $2^{nd}$ CSI to the base station independently or dependently.

3.3 CSI Reporting Method

A method of reporting CSI obtained with reference to 3.2 is described in the following. In case that a user equipment feeds back CSI to a base station, the user equipment can set both a reporting time and a reporting period of the CSI for a $1^{st}$ antenna set different from those of the CSI for a $2^{nd}$ antenna set.

Figure 21:
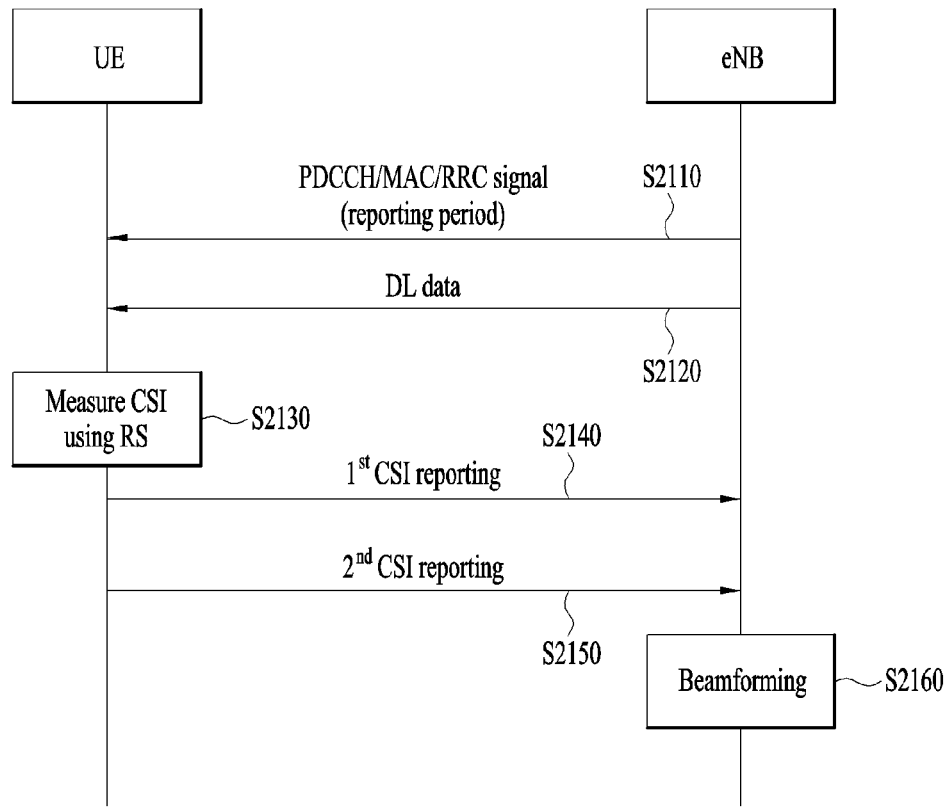
FIG. 21 is a flowchart for one of methods for reporting CSIs for both a 1st antenna set and a $2^{nd}$ antenna set.

FIG. 21 is a flowchart for one of methods for reporting CSIs for both a $1^{st}$ antenna set and a $2^{nd}$ antenna set.

In the embodiments of the present invention, the CSI for the $1^{st}$ antenna set is defined as a $1^{st}$ CSI and the CSI for the $2^{nd}$ antenna set is defined as a $2^{nd}$ CSI. Referring to FIG. 21, a base station can inform a user equipment of a reporting period information on the $1^{st}$ CSI and/or the $2^{nd}$ CSI through a PDCCH signal, MAC signaling or RRC signaling [S2110].

The base station transmits downlink data to the user equipment using the $1^{st}$ antenna set and $2^{nd}$ antenna set. In this case, the base station enables the user equipment to perform a channel estimation and CSI measurement by transmitting RS through the $1^{st}$ antenna set together with the DL data [S2120].

The user equipment can measure the $1^{st}$ CSI for the $1^{st}$ antenna set and the $2^{nd}$ CSI for the $2^{nd}$ antenna set using the methods mentioned with reference to 3.1 and 3.2 [S2130].

Thereafter, the user equipment can report or feedback the $1^{st}$ CSI and/or the $2^{nd}$ CSI to the base station in accordance with the reporting period information received in the step S1610. [S2140, S2150].

Moreover, the base station can perform precoding and beamforming on downlink using the reported $1^{st}$ CSI and $2^{nd}$ CSI [S2160].

3.3.1 Independent CSI Reporting Method

A reporting time and reporting period of CQI/PMI for a $1^{st}$ antenna set and those of CQI/PMI for a $2^{nd}$ antenna set can be independently set with each other. In this case, a base station can transmit a reporting period information including informations on the reporting period and reporting time (e.g., $1^{st}$ CSI reporting period information) for the $1^{st}$ antenna set and informations on the reporting period and reporting time (e.g., $2^{nd}$ CSI reporting period information) for the $2^{nd}$ antenna set to a user equipment in the step S2110.

In this case, the user equipment can report the $1^{st}$ CSI and/or the $2^{nd}$ CSI to the base station according to the reporting period and reporting time for each of antenna sets.

3.3.2 Dependent CSI Reporting Method

CSI reporting for a $2^{nd}$ antenna set can be operated in a dependent relation with a CSI reporting period for a $1^{st}$ antenna set. For instance, a reporting period information may include only an information on a reporting period and reporting time for only a $1^{st}$ antenna set in the step S2110. In this case, the CSI reporting for the $2^{nd}$ antenna set can be performed in a period corresponding to an integer multiple of a $1^{st}$ CSI reporting period. In this case, the integer multiple can be included in the reporting period information in the step S2110 or operated as a fixed constant value on a system.

Figure 22:
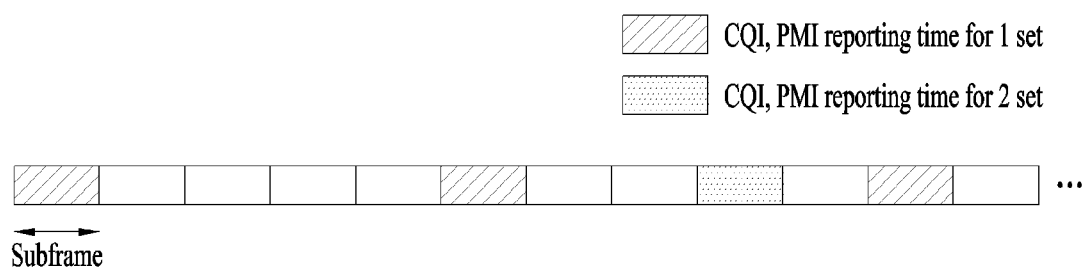
FIG. 22 is a diagram for one example of both a reporting period for a $2^{nd}$ antenna set and a reporting time for the $2^{nd}$ antenna set configured dependently.

FIG. 22 is a diagram for one example of both a reporting period for a $2^{nd}$ antenna set and a reporting time for the $2^{nd}$ antenna set configured dependently.

A reporting time for a $2^{nd}$ antenna set can be configured with a time difference value (different time or number of subframe) of a reporting time for a $1^{st}$ antenna set. In this case, the time difference value can be informed through signaling in the step S1610 or operated as a fixed constant value on a system.

Referring to FIG. 22, it can be checked that $2^{nd}$ CSI reporting period for the $2^{nd}$ antenna set is configured in a manner of being double of $1^{st}$ CSI reporting period for the $1^{st}$ antenna set. And, it can be also checked that $2^{nd}$ CSI reporting time for the $2^{nd}$ antenna set is different from the $1^{st}$ CSI reporting time for the $1^{st}$ antenna set by 3 subframes. However, the example shown in FIG. 22 is just exemplary and the $2^{nd}$ CSI reporting period and time for the $2^{nd}$ antenna set can be changed depending on a system environment and/or a channel environment.

3.3.3. Beamforming Method

A base station can perform precoding on a downlink channel using feedback on a $1^{st}$ CSI report and $2^{nd}$ CSI report received from a user equipment and then perform beamforming in the step S2160.

3.3.3.1 Beamforming Method #1 in Case of Receiving $1^{st}$ CSI Only

In case that a base station receives feedback on only a $1^{st}$ CSI for a $1^{st}$ antenna set from a user equipment, the base station can perform beamforming on the corresponding user equipment using antennas corresponding to the $1^{st}$ antenna set only.

Alternatively, in case that a base station receives the feedback on only the $1^{st}$ CSI for the $1^{st}$ antenna set, the base station can obtain CSI for a $2^{nd}$ antenna set using the $1^{st}$ CSI. In this case, the base station can obtain the $2^{nd}$ CSI for the $2^{nd}$ antenna set using the interpolation, the MMSE estimating method and the like mentioned with reference to 3.1. Subsequently, the base station performs beamforming using (N×L) precoding matrix.

However, in case of the MMSE estimating method, since a base station should receive feedback on AS, AOA value or the like from a user equipment, additional feedback process for the AS, AOA value or the like is required.

3.3.3.2 Beamforming Method #2 in Case of Receiving $1^{st}$ CSI Only

In case that a base station receives a $1^{st}$ CSI for a $1^{st}$ antenna set and either magnitude difference value and/or angle difference value between antennas, which are adjacent to the $1^{st}$ antenna set, of a $2^{nd}$ antenna set or magnitude difference value and/or angle difference value for a representable antenna of the $2^{nd}$ antenna set, the base station can obtain a $2^{nd}$ CSI for the $2^{nd}$ antenna set using the $1^{st}$ CSI and the magnitude difference value and/or angle difference value.

In particular, the $2^{nd}$ CSI corresponding to the $2^{nd}$ antenna set can be represented as Formula 21 in the following. Thus, the base station can perform beamforming using (N×L) precoding matrix based on the Formula 21.

$$2\text{set CSI} = 1\text{set CSI} + \alpha \angle \theta (\alpha\text{:difference magnitude}, \theta\text{: difference angle}) \quad \text{[Formula 21]}$$

3.3.3.3 Beamforming Method Using $1^{st}$ CSI and $2^{nd}$ CSI

In case that both a $1^{st}$ CSI for a $1^{st}$ antenna set and a $2^{nd}$ CSI for a $2^{nd}$ antenna set are received, a base station can calculate PMIs for N of antennas through Kronecker product operation as Formula 22 in the following. The base station can calculate (N×L) precoding matrix through the above process and then perform beamforming using the calculated precoding matrix.

$$W = W_1 \otimes W_2 \quad \text{[Formula 22]}$$

($W_1$: Precoding matrix for 1 set, $W_2$: Precoding matrix for 2set)

4. Apparatus

Figure 23:
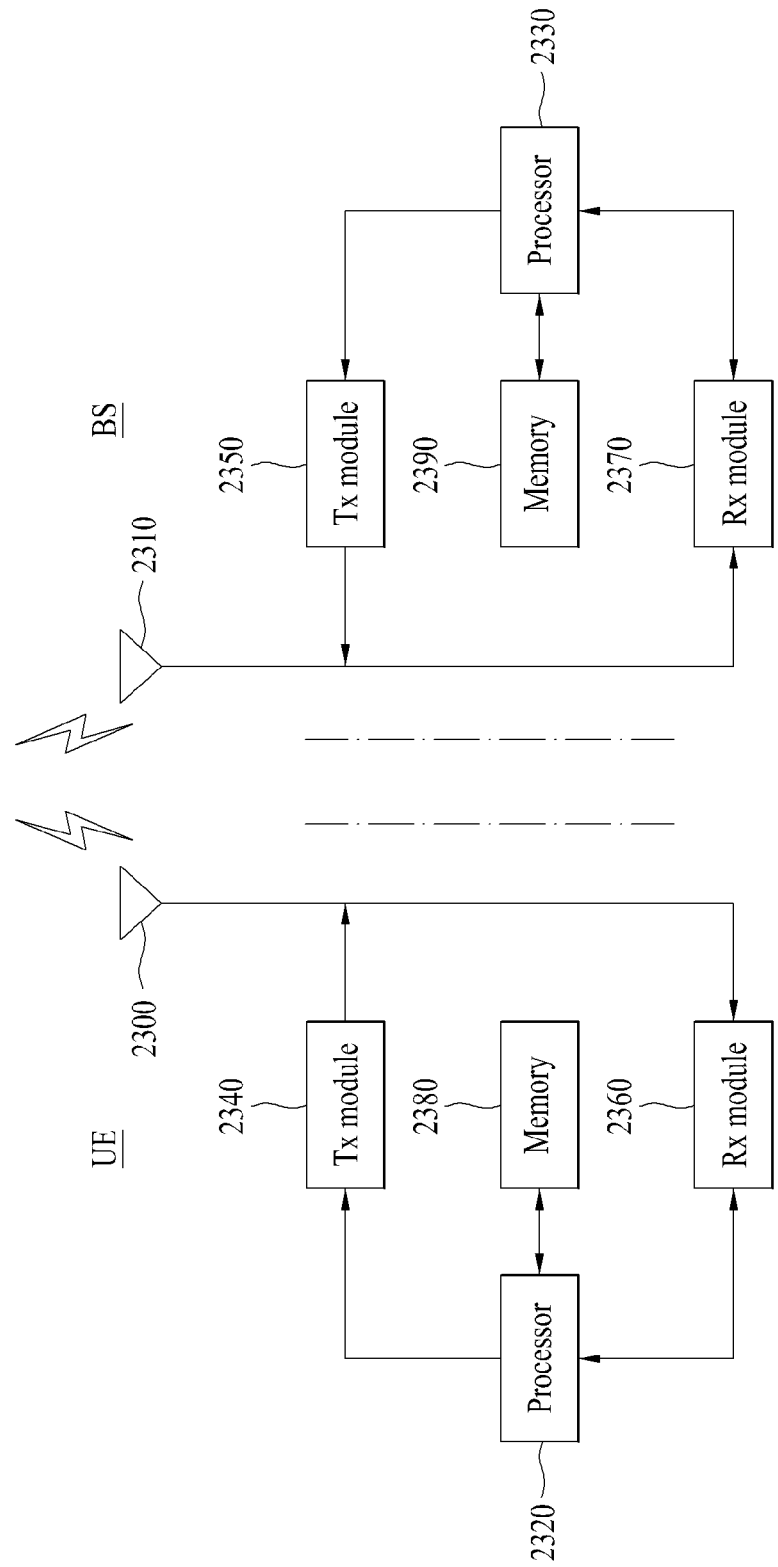
FIG. 23 is a diagram of a device corresponding to a means capable of implementing methods mentioned with reference to FIGS. 1 to 22.

Apparatuses illustrated in FIG. 23 are means that can implement the methods described before with reference to FIGS. 1 to 22.

A UE may act as a transmitter on a UL and as a receiver on a DL. An eNB may act as a receiver on a UL and as a transmitter on a DL.

That is, each of the UE and the eNB may include a Transmission (Tx) module 2340 or 2350 and a Reception (Rx) module 2360 or 2370, for controlling transmission and reception of information, data, and/or messages, and an antenna 2300 or 2310 for transmitting and receiving information, data, and/or messages.

Each of the UE and the eNB may further include a processor 2320 or 2330 for implementing the afore-described embodiments of the present disclosure and a memory 2380 or 2390 for temporarily or permanently storing operations of the processor 2320 or 2330.

The embodiments of the present invention can be implemented using constituents and functions of each of a user equipment and base station device mentioned in the foregoing description. For instance, a processor of the user equipment can control a receiving module (or, receiver) to receive a signal (e.g., PDCCH signal/MAC signal/RRC signal etc.) including a reporting period information and to receive downlink data including a reference signal. Subsequently, the processor can measure a $1^{st}$ CSI for a $1^{st}$ antenna set using the reference signal and then obtain a $2^{nd}$ CSI based on the $1^{st}$ CSI. The processor of the user equipment can report the $1^{st}$ CSI and/or the $2^{nd}$ CSI to the base station based on the reporting period information. The processor of the base station can control a transmitter (or, transmitting module) to transmit the signal including the reporting period information to the user equipment and to transmit the downlink data including the reference signal to the user equipment. Subsequently, the processor can receive a report of the $1^{st}$ CSI and/or the $2^{nd}$ CSI from the user equipment at a time indicated by the reporting period information. Detailed operating methods related to the device refer to the description mentioned with Reference to 1 to 3.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 2380 or 2390 and executed by the processor 2320 or 2330. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

What is claimed is:

1. A method of transmitting channel state information (CSI) by a user equipment in a wireless access system supportive of a plurality of antennas, the method comprising the steps of:
   receiving, from a base station, reporting period information;
   receiving, from the base station, a reference signal via a first antenna set of the plurality of antennas of the base station;
   generating first CSI for the first antenna set using the reference signal;
   obtaining second CSI for a second antenna set of the plurality of antennas based on the first CSI and spatial correlation between the first antenna set and the second antenna set; and
   reporting, to the base station, the first CSI and the second CSI based on the reporting period information,
   wherein the first CSI comprises an information on the first antenna set including antennas configured to transmit the reference signal, and
   wherein the second CSI comprises to an information on the second antenna set including antennas configured to not transmit the reference signal.

2. The method of claim 1, wherein the reporting period information comprises at least one of an information on a reporting period and a reporting time for the first CSI and an information on a reporting period and a reporting time for the second CSI.

3. The method of claim 2, wherein the reporting period and the reporting time for the first CSI are independent from the reporting period and the reporting time for the second CSI.

4. The method of claim 1, wherein the reporting period information comprises an information on a reporting period and a reporting time for the first CSI only, and
wherein a reporting period and a reporting time for the second CSI are determined based on the reporting period and the reporting time for the first CSI.

5. A user equipment for transmitting a channel state information (CSI) in a wireless access system supportive of a plurality of antennas, the user equipment comprising:
a receiver;
a transmitter; and
a processor;
wherein the processor is configured to:
control the receiver to receive, from a base station, a reporting period information,
control the receiver to receive, from a base station, a reference signal via a first antenna set of the base station,
generate first CSI for the first antenna set using the reference signal,
obtain second CSI for a second antenna set of the base station based on the first CSI and spatial correlation between the first antenna set and the second antenna set, and
control the transmitter to report, to the base station, the first CSI and the second CSI based on the reporting period information, and
wherein the first CSI comprises an information on the first antenna set including antennas configured to transmit the reference signal, and
wherein the second CSI comprises an information on the second antenna set including antennas configured to not transmit the reference signal.

6. The user equipment of claim 5, wherein the reporting period information comprises at least one of an information on a reporting period and a reporting time for the first CSI and an information on a reporting period and a reporting time for the second CSI.

7. The user equipment of claim 6, wherein the reporting period and the reporting time for the first CSI are independent from the reporting period and the reporting time for the second CSI.

8. The user equipment of claim 5, wherein the reporting period information comprises an information on a reporting period and a reporting time for the first CSI only, and
wherein a reporting period and a reporting time for the second CSI are determined based on the reporting period and the reporting time for the first CSI.

9. The method of claim 1, wherein the spatial correlation is obtained based on an angle of arrival (AOA) of a transmission signal, an azimuth spread (AS) value of the transmission signal and a distance between the plurality of antennas.

10. The method of claim 1, wherein the second CSI is obtained by interpolating channel state corresponding to the first CSI or by applying minimum mean square error (MMSE) estimation on the channel state corresponding to the first CSI.

11. The method of claim 10, wherein the MMSE estimation is applied on the channel state corresponding to the first CSI by using a cross correlation vector between the first antenna set and the second antenna set and using an auto correlation vector between the channel state corresponding to the first CSI.

12. The user equipment of claim 5, wherein the spatial correlation is obtained based on an angle of arrival (AOA) of a transmission signal, an azimuth spread (AS) value of the transmission signal and a distance between the plurality of antennas.

13. The user equipment of claim 5, wherein the second CSI is obtained by interpolating channel state corresponding to the first CSI or by applying minimum mean square error (MMSE) estimation on the channel state corresponding to the first CSI.

14. The user equipment of claim 13, wherein the MMSE estimation is applied on the channel state corresponding to the first CSI by using a cross correlation vector between the first antenna set and the second antenna set and using an auto correlation vector between the channel state corresponding to the first CSI.

* * * * *